(12) United States Patent
Lapstun et al.

(10) Patent No.: US 7,832,626 B2
(45) Date of Patent: Nov. 16, 2010

(54) ANONYMOUS COMPETITION ENTRY

(75) Inventors: Paul Lapstun, Balmain (AU); Kia Silverbrook, Balmain (AU); Jacqueline Anne Lapstun, Balmain (AU); Paul Quentin Scott, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 1467 days.

(21) Appl. No.: 10/815,630

(22) Filed: Apr. 2, 2004

(65) Prior Publication Data

US 2004/0199414 A1 Oct. 7, 2004

Related U.S. Application Data

(63) Continuation-in-part of application No. 09/575,197, filed on May 23, 2000.

(30) Foreign Application Priority Data

| May 25, 1999 | (AU) | .................................. PQ0559 |
| Jun. 30, 1999 | (AU) | .................................. PQ1312 |
| Jun. 30, 1999 | (AU) | .................................. PQ1313 |
| Sep. 17, 1999 | (AU) | .................................. PQ2912 |
| Oct. 25, 1999 | (AU) | .................................. PQ3632 |
| Apr. 7, 2003 | (AU) | ............................ 2003901617 |
| Apr. 15, 2003 | (AU) | ............................ 2003901795 |

(51) Int. Cl.
*G06Q 40/00* (2006.01)
*G07D 11/00* (2006.01)
*G07F 19/00* (2006.01)
*G06K 5/00* (2006.01)

(52) U.S. Cl. ........................ 235/379; 235/380; 705/35; 705/37

(58) Field of Classification Search ..................... 705/1, 705/7, 10, 14, 16, 23, 35, 37; 726/20; 235/375, 235/383, 494, 379, 380; 463/29, 36, 42
See application file for complete search history.

(56) References Cited

U.S. PATENT DOCUMENTS 3,613,066 A 10/1971 Cooreman
4,564,928 A 1/1986 Glenn et al.

(Continued)

FOREIGN PATENT DOCUMENTS

DE 4326526 9/1994

(Continued)

OTHER PUBLICATIONS

"Paperless Signature: PenOP adds secure handwritten signature to Microsoft Word"; EDGE: Work-Group Computing Report; Jan. 27, 1997; pp. 1 and 2.*

(Continued)

*Primary Examiner*—Ella Colbert

(57) ABSTRACT

A method of enabling anonymous entry to a competition via a printed competition entry form that includes machine-readable coded data, the method including the steps, performed in a computer system, of: receiving interaction data representing interaction of a sensing device with the coded data, the interaction data enabling the competition entry to be electronically captured in the computer system; assigning a competition alias ID to the competition entry; and transmitting the competition entry to a competition administrator with the competition alias ID, thereby enabling the anonymous entry to the competition.

21 Claims, 28 Drawing Sheets

U.S. PATENT DOCUMENTS

| | | | |
|---|---|---|---|
| 4,670,751 A | | 6/1987 | Enokido et al. |
| 4,711,977 A | | 12/1987 | Miyamori et al. |
| 4,712,100 A | | 12/1987 | Tsunekuni et al. |
| 4,777,329 A | | 10/1988 | Mallicoat |
| 4,832,341 A | * | 5/1989 | Muller et al. .................. 463/17 |
| 4,864,618 A | | 9/1989 | Wright et al. |
| 5,023,408 A | | 6/1991 | Murakami et al. |
| 5,051,736 A | | 9/1991 | Bennett et al. |
| 5,080,364 A | * | 1/1992 | Seidman ....................... 463/17 |
| 5,086,197 A | | 2/1992 | Liou |
| 5,159,321 A | | 10/1992 | Masaki et al. |
| 5,247,137 A | | 9/1993 | Epperson |
| 5,248,856 A | | 9/1993 | Mallicoat |
| 5,283,829 A | | 2/1994 | Anderson |
| 5,297,202 A | | 3/1994 | Kapp et al. |
| 5,326,959 A | | 7/1994 | Perazza |
| 5,383,113 A | | 1/1995 | Kight et al. |
| 5,434,370 A | | 7/1995 | Wilson et al. |
| 5,448,263 A | | 9/1995 | Martin |
| 5,465,206 A | | 11/1995 | Hilt et al. |
| 5,465,299 A | | 11/1995 | Matsumoto et al. |
| 5,477,012 A | | 12/1995 | Sekendur |
| 5,483,069 A | | 1/1996 | Kofune et al. |
| 5,594,226 A | | 1/1997 | Steger |
| 5,652,412 A | | 7/1997 | Lazzouni et al. |
| 5,661,506 A | | 8/1997 | Lazzouni et al. |
| 5,673,430 A | | 9/1997 | Story |
| 5,692,073 A | | 11/1997 | Cass |
| 5,696,906 A | | 12/1997 | Peters et al. |
| 5,699,528 A | | 12/1997 | Hogan |
| 5,727,249 A | | 3/1998 | Pollin |
| 5,754,655 A | | 5/1998 | Hughes et al. |
| 5,802,498 A | | 9/1998 | Comesanas |
| 5,822,291 A | | 10/1998 | Brindze et al. |
| 5,832,460 A | | 11/1998 | Bednar et al. |
| 5,852,434 A | | 12/1998 | Sekendur |
| 5,855,369 A | * | 1/1999 | Lieberman .................. 273/139 |
| 5,866,856 A | | 2/1999 | Holtzman |
| 5,871,398 A | | 2/1999 | Schneier et al. |
| 5,886,337 A | * | 3/1999 | Rockstein et al. ...... 235/472.01 |
| 5,890,086 A | | 3/1999 | Wellman et al. |
| 5,892,824 A | | 4/1999 | Beatson et al. |
| 5,917,725 A | | 6/1999 | Thacher et al. |
| 5,978,773 A | * | 11/1999 | Hudetz et al. .................. 705/23 |
| 6,014,634 A | * | 1/2000 | Scroggie et al. ............... 705/14 |
| 6,056,289 A | * | 5/2000 | Clapper, Jr. .............. 273/138.2 |
| 6,076,734 A | | 6/2000 | Dougherty et al. |
| 6,130,666 A | * | 10/2000 | Persidsky .................... 345/179 |
| 6,229,807 B1 | | 5/2001 | Bauchot et al. |
| 6,330,608 B1 | | 12/2001 | Stiles |
| 6,330,976 B1 | | 12/2001 | Dymetman et al. |
| 6,527,638 B1 | | 3/2003 | Walker et al. |
| 6,542,927 B2 | | 4/2003 | Rhoads |
| 6,875,105 B1 | * | 4/2005 | Behm et al. .................... 463/17 |
| 6,964,374 B1 | | 11/2005 | Djuknic et al. |
| 7,054,830 B1 | * | 5/2006 | Eggleston et al. ............. 705/14 |
| 2005/0004981 A1 | * | 1/2005 | Philyaw ..................... 709/204 |

FOREIGN PATENT DOCUMENTS

| | | |
|---|---|---|
| DE | 4326756 A | 9/1994 |
| EP | 1203328 A | 5/2002 |
| FR | 2516672 A | 5/1983 |
| FR | 2516673 | 5/1983 |
| GB | 2226670 A | 7/1990 |
| GB | 2306669 A | 5/1997 |
| GB | 2202664 A | 9/1998 |
| JP | 10-194562 A | 7/1998 |
| WO | WO 97/14251 | 4/1997 |
| WO | WO 99/18487 | 4/1999 |
| WO | WO 99/19823 A2 | 4/1999 |
| WO | WO 99/50787 | 10/1999 |
| WO | WO 02084583 A1 | 10/2002 |

OTHER PUBLICATIONS

"A.T. Cross Company Selects Cardiff Software as Exclusive Supplier of Forms Software for Cross Pad Portable Digital Notepad"; PR Newswire; Apr. 13, 1999; pp. 1-3.*

Dymetman, M., and Copperman, M., Intelligent Paper; in Electronic Publishing, Artistic Imaging, and Digital Typography, Proceedings of EP '98, Mar./Apr. 1998, Springer Verlag LNCS 1375, pp. 392-406.

PR Newswire, "A.T. Cross Company Selects Cardiff Software as Exclusive Supplier of forms Software for CrossPad Portable Digital Notepad", Apr. 13, 1999, pp. 1-3.

* cited by examiner

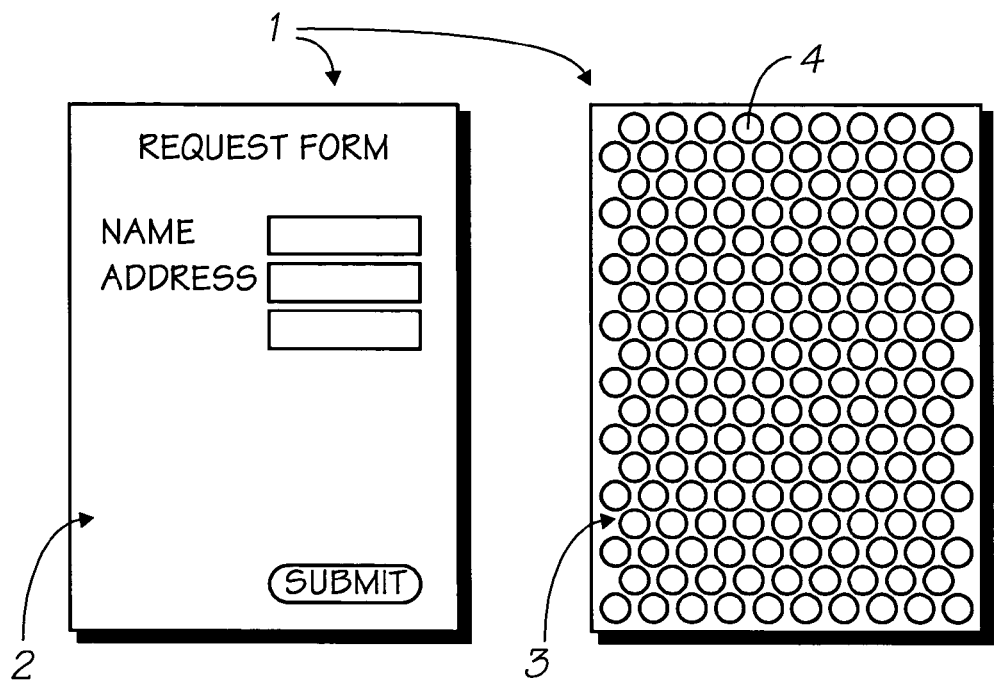
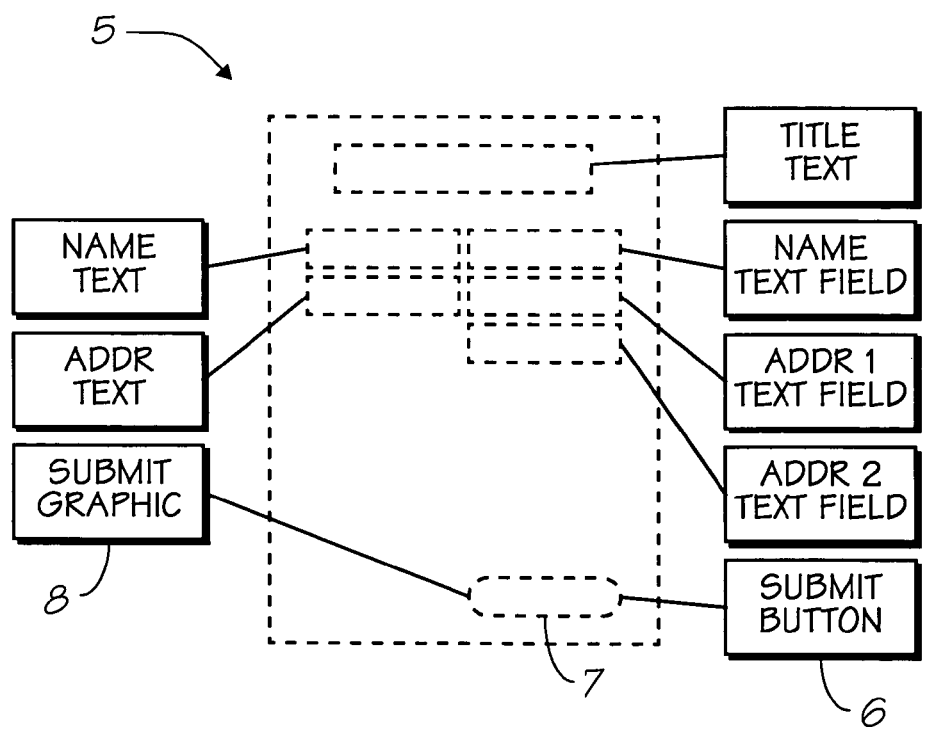
FIG. 1

COMPETITION NAME — 50
COMPETITION ENTRY FORM

COMP DESC — 51

CONDITIONS — 52

(MORE INFO) — 53

TELL US, IN 20 WORDS OR LESS, WHY YOU LIKE OUR PRODUCT

TEXT — 57

ARE YOU LIKELY TO BUY THIS PRODUCT AGAIN?
☐ YES  ☐ NO
— 58

PLEASE SIGN HERE TO CERTIFY YOU ARE OVER 18

SIGNATURE — 59

(SUBMIT ENTRY) — 54

CLICK HERE AT ANY TIME TO CHECK IF YOU HAVE WON (PRINT) — 55

56 — (HAVE I WON?)

FIG. 5

COMPETITION DETAILS

PAGE 1 OF 1

COMPETITION NAME

THE DETAILS OF THIS COMPETITION ARE AS FOLLOWS:

COMPETITION DESCRIPTION:

COMP DESC

COMPETITION CONDITIONS:

CONDITIONS

COMPETITION START: START DATE

COMPETITION END: END DATE

OTHER DETAILS

PRIZE DETAILS

PRIZE DETAILS

FIG. 6

```
COMPETITION ENTRY CONFIRMATION MESSAGE
       ENTRY SUBMITTED :  [ DATE ]  [ TIME ]

[ COMPETITION NAME ]

YOUR ENTRY HAS BEEN RECEIVED
                   GOOD LUCK!
```

FIG. 7

```
COMPETITION ENTRY STATUS
            ENTRY SUBMITTED :  [ DATE ]  [ TIME ]

[ COMPETITION NAME ]

CONGRATULATIONS!
                  YOU HAVE WON A PRIZE
      [ PRIZE DETAILS                                    ]

TO CLAIM YOUR PRIZE WE NEED TO KNOW YOUR DETAILS
      CLICK <CLAIM PRIZE> TO AUTHORIZE US TO CONTACT YOU ( CLAIM PRIZE )
                    (  NO THANKS  )
```

FIG. 8

COMPETITION PRIZE CLAIM

COMPETITION NAME

CONGRATULATIONS ON WINNING YOUR PRIZE:

PRIZE DETAILS

YOUR PRIZE WILL BE SENT TO YOU SOON
THANKYOU!

FIG. 9

COMPETITION NAME

INSTANT WIN COMPETITION

TICK THREE CORRECT ANSWERS AND WIN A FREE PACKET OF MINTS

WHAT COLOR ARE OUR MINTS?
☐ BLUE ☐ GREEN ☐ WHITE

WHAT ANIMAL FEATURES IN OUR AD?
☐ KANGAROO ☐ PENGUIN ☐ BEAR

WHAT OTHER PRODUCTS COME IN OUR RANGE?
☐ CARS ☐ CHOCOLATES ☐ SHOES ( SUBMIT ENTRY ) — 151

( PRINT ) — 152

INSTANT WIN COMPETITION

CONGRATULATIONS! YOU HAVE WON A
FREE PACKET OF MINTS!

PRINT COUPON ~171

COMPETITION NAME

*COMPETITION ENTRY FORM*

COMP DESC

CONDITIONS ( MORE INFO )

TELL US, IN 20 WORDS OR LESS, WHY YOU LIKE OUR PRODUCT

TEXT

ARE YOU LIKELY TO BUY THIS PRODUCT AGAIN?
☐ YES  ☐ NO

PLEASE SIGN HERE TO CERTIFY YOU ARE OVER 18

SIGNATURE                    ( SUBMIT ENTRY )

CLICK HERE AT ANY TIME TO
CHECK IF YOU HAVE WON ( PRINT )                    ( HAVE I WON? )

*FIG. 32*

ANONYMOUS COMPETITION ENTRY

CROSS REFERENCES TO RELATED APPLICATIONS

The present application is a Continuation-in-Part of U.S. application Ser. No. 09/575,197 filed on May 23, 2000.

FIELD OF THE INVENTION

The invention relates generally to the field of promotional competitions for retail sale of product items, typically high volume, low cost grocery items. In particular, the invention relates to the use of invisible product tagging.

CO-PENDING APPLICATIONS

Various methods, systems and apparatus relating to the present invention are disclosed in the following co-pending applications, the disclosures of which are incorporated herein by cross-reference:

| | | | | | |
|---|---|---|---|---|---|
| 10/815,621 | 7,243,835 | 10/815,637 | 10/815,638 | 10/815,640 | 10/815,642 |
| 7,097,094 | 7,137,549 | 10/815,618 | 7,156,292 | 10/815,635 | 10/815,647 |
| 10/815,634 | 7,137,566 | 7,131,596 | 7,128,265 | 7,207,485 | 7,197,374 |
| 7,175,089 | 10/815,617 | 10/815,620 | 7,178,719 | 10/815,613 | 7,207,483 |
| 10/815,619 | 10/815,616 | 10/815,614 | 10/815,636 | 7,128,270 | 10/815,609 |
| 7,150,398 | 7,159,777 | 10/815,610 | 7,188,769 | 7,097,106 | 7,070,110 |
| 7,243,849 | 7,204,941 | 10/815,624 | 10/815,628 | | |

CROSS REFERENCES

Various methods, systems and apparatus relating to the present invention are disclosed in the following co-pending applications filed by the applicant or assignee of the present invention. The disclosures of all of these co-pending applications and granted patents are incorporated herein by cross-reference.

| | | | | | |
|---|---|---|---|---|---|
| 7,156,289 | 7,178,718 | 7,225,979 | 09/575,197 | 7,079,712 | 6,825,945 |
| 09/575,165 | 6,813,039 | 7,190,474 | 6,987,506 | 6,824,044 | 6,980,318 |
| 6,816,274 | 7,102,772 | 09/575,186 | 6,681,045 | 6,678,499 | 6,679,420 |
| 6,963,845 | 6,976,220 | 6,728,000 | 7,110,126 | 7,173,722 | 6,976,035 |
| 6,813,558 | 6,766,942 | 6,965,454 | 6,995,859 | 7,088,459 | 6,720,985 |
| 09/609,303 | 6,922,779 | 6,978,019 | 6,847,883 | 7,131,058 | 09/721,895 |
| 09/607,843 | 09/693,690 | 6,959,298 | 6,973,450 | 7,150,404 | 6,965,882 |
| 7,233,924 | 09/575,181 | 09/722,174 | 7,175,079 | 7,162,259 | 6,718,061 |
| 10/291,523 | 10/291,471 | 7,012,710 | 6,825,956 | 10/291,481 | 7,222,098 |
| 10/291,825 | 10/291,519 | 7,031,010 | 6,972,864 | 6,862,105 | 7,009,738 |
| 6,989,911 | 6,982,807 | 10/291,576 | 6,829,387 | 6,714,678 | 6,644,545 |
| 6,609,653 | 6,651,879 | 10/291,555 | 10/291,510 | 10/291,592 | 10/291,542 |
| 7,044,363 | 7,004,390 | 6,867,880 | 7,034,953 | 6,987,581 | 7,216,224 |
| 10/291,821 | 7,162,269 | 7,162,222 | 10/291,822 | 10/291,524 | 10/291,553 |
| 6,850,931 | 6,865,570 | 6,847,961 | 10/685,523 | 10/685,583 | 7,162,442 |
| 10/685,584 | 7,159,784 | 10/804,034 | 10/793,933 | 7,068,382 | 7,007,851 |
| 6,957,921 | 6,457,883 | 10/743,671 | 7,094,910 | 7,091,344 | 7,122,685 |
| 7,038,066 | 7,099,019 | 7,062,651 | 6,789,194 | 6,789,191 | 6,644,642 |
| 6,502,614 | 6,622,999 | 6,669,385 | 6,827,116 | 6,549,935 | 10/536,082 |
| 6,987,573 | 6,727,996 | 6,591,884 | 6,439,706 | 6,760,119 | 09/575,198 |
| 7,064,851 | 6,826,547 | 6,290,349 | 6,428,155 | 6,785,016 | 6,831,682 |
| 6,741,871 | 6,927,871 | 6,980,306 | 6,965,439 | 6,840,606 | 7,036,918 |
| 6,977,746 | 6,970,264 | 7,068,389 | 7,093,991 | 7,190,491 | 6,982,798 |
| 6,870,966 | 6,822,639 | 6,474,888 | 6,627,870 | 6,724,374 | 6,788,982 |
| 09/722,141 | 6,788,293 | 6,946,672 | 6,737,591 | 7,091,960 | 09/693,514 |
| 6,792,165 | 7,105,753 | 6,795,593 | 6,980,704 | 6,768,821 | 7,132,612 |
| 7,041,916 | 6,797,895 | 7,015,901 | 10/782,894 | 7,148,644 | 10/778,056 |
| 10/778,058 | 10/778,060 | 10/778,059 | 10/778,063 | 10/778,062 | 10/778,061 |
| 10/778,057 | 7,055,739 | 7,233,320 | 6,830,196 | 6,832,717 | 7,182,247 |
| 7,082,562 | 6,843,420 | 10/291,718 | 6,789,731 | 7,057,608 | 6,766,944 |
| 6,766,945 | 10/291,715 | 10/291,559 | 10/291,660 | 10/409,864 | 7,108,192 |
| 7,111,791 | 10/786,631 | 10/683,151 | 10/683,040 | 10/778,090 | 6,957,768 |
| 09/575,172 | 7,170,499 | 7,106,888 | 7,123,239 | 6,982,701 | 6,982,703 |
| 7,227,527 | 6,786,397 | 6,947,027 | 6,975,299 | 7,139,431 | 7,048,178 |
| 7,118,025 | 6,839,053 | 7,015,900 | 7,010,147 | 7,133,557 | 6,914,593 |
| 10/291,546 | 6,454,482 | 6,808,330 | 6,527,365 | 6,474,773 | 6,550,997 |
| 7,093,923 | 6,957,923 | 7,131,724 | | | |

BACKGROUND

Due to the significant proliferation of low cost retail outlets for staples and other consumables, there has developed a wide range of marketing schemes to attract customers to individual stores or specific products. These schemes are not directly based on product or price differentiation. For instance, most customers are familiar with the range of competitions that promote products. These competitions typically require a customer to send in an entry form. Many customers cannot be bothered submitting the entry forms so the of the promotion is undermined.

Other competitions or promotions require the collection of tokens that may be redeemed for a prize. There are also instant win competitions that alert a customer to prize when they peel off a label, open a cap, or similar action. In some cases it is necessary to provide demographic data before the prize can be redeemed.

OBJECT

It is an object of the invention to provide the public with a useful alternative to existing product promotion competitions.

SUMMARY OF THE INVENTION

In a first aspect the present invention provides a method of enabling entry to a competition via machine-readable coded data on an entry form on a printed label of a product, the method including the steps of: receiving, in a computer system, interaction data from a sensing device, the interaction data representing interaction of the sensing device with the coded data on the entry form, the interaction data allowing the competition entry to be electronically captured in the computer system; and transmitting the competition entry to a competition administrator.

In a further aspect the present invention provides a method of enabling entry to a competition via a printed label of a product, the label including: machine-readable coded data relating to an identity of the product label; and human-readable information relating to the competition, the method including the steps of: using a sensing device, reading at least some of the coded data while the sensing device is used by a user to draw or write on the interface, and generating interaction data based on the read coded data, the interaction data being indicative of a position of the sensing device relative to the interface and of the identity of the product label; receiving, in a computer system, the interaction data from the sensing device; and transmitting competition entry information based on the interaction data to a competition administrator, the competition administrator being configured to record a competition entry based on the competition entry information.

In another aspect the present invention provides a system for enabling competition entry using machine-readable coded data on a printed competition entry form on a label of a product, and a sensing device configured to sense at least some of the coded data from a form and generating interaction data, said interaction data representing interaction of the sensing device with the coded data, the system including a computer system configured and programmed to: receive the interaction data and electronically capture the competition entry on the basis of the interaction data; and transmit the competition entry to a competition administrator.

In a further aspect the present invention provides a system for enabling competition entry via a product label including human-readable information relating to a competition and machine-readable coded data relating to an identity of the label, and a sensing device configured to sense the machine-readable coded data as the sensing device is used to interact with the product label, and to generate interaction data based at least partly on the sensed coded data, the system including a computer system configured and programmed to: receive the interaction data from the sensing device; correlate the interaction data with a competition; and record an entry in the competition based on the correlation.

In another aspect the present invention provides a product label including coded data and human-readable information, the label being configured for use with the methods and systems of the above paragraphs.

In a second aspect the present invention provides a product label for enabling entry to a competition, the product label comprising: machine-readable coded data indicative of at least an identity of the label, said machine-readable coded data being readable by a sensing device as the sensing device is moved across the product label, thereby to produce interaction data for enabling the competition entry; human-readable information pertaining to the competition, the human-readable information being at least partially coincident with the machine-readable coded data, the human-readable information including at least one field element that has a corresponding zone defined in relation to it in a page description stored in a remote computer system.

In a further aspect the present invention provides a method of enabling entry to a competition using a product label that includes human-readable information relating to a competition and machine-readable coded data relating to an identity of the label, the human-readable information including at least one field element that has a corresponding zone defined in relation to it in a page description stored in a remote computer system, the method including the steps of, using a sensing device, of: sensing at least some of the coded data as the sensing device is used to interact with at least one of the at least one field elements; using the sensed coded data to generate interaction data representing the identity of the label and a position of the sensing device relative to the interface surface; and transmitting the interaction data to a computer system for enabling entry to the competition via the computer system determining that the interaction data represents interaction of the sensing device with at least one of the at least one field elements.

In a further aspect the present invention provides a system for enabling competition entry using a printed product label, the system comprising: a sensing device configured to: sense coded data from the label; and generate interaction data representing interaction of the sensing device with the coded data, wherein the form comprises regions selected from the group comprising information fields, buttons, and entry fields; and a computer system configured to receive the interaction data and correlate the interaction data with a competition.

In another aspect the present invention provides a system for competition entry using printed labels, the system comprising: a product label including human-readable information relating to a competition and machine-readable coded information relating to an identity of the label, wherein the product label further comprises regions selected from the group consisting of information fields, buttons, and entry fields; a sensing device configured to sense the machine-readable coded data as the sensing device is moved across the product label, and to generate interaction data based on the sensed coded data; a computer system programmed to correlate the interaction data with a competition and to record an entry in the competition based on the correlated interaction data.

In a third aspect the present invention provides a method of enabling anonymous entry to a competition via a printed competition entry form that includes machine-readable coded data, the method including the steps, performed in a computer system, of: receiving interaction data representing interaction of a sensing device with the coded data, the interaction data enabling the competition entry to be electronically captured in the computer system; assigning a competition alias ID to the competition entry; and transmitting the competition entry to a competition administrator with the competition alias ID, thereby enabling the anonymous entry to the competition.

In a further aspect the present invention provides a method of enabling anonymous entry to a competition via a printed product label that includes human-readable information relating to the competition and machine-readable coded data relating to an identity of the label, the method including the steps of: receiving, in a computer system, interaction data generated by a sensing device, the interaction data being derived from at least some of the machine-readable coded data sensed by a sensing device in response to a user using the sensing device to draw, write, point or click on the label, the interaction data being indicative of a position of the sensing device relative to the sensed coded data; assigning a competition alias ID to the interaction data; and transmitting the interaction data and the competition alias ID to a competition administrator for correlation with the competition, thereby enabling anonymous entry to the competition.

In a further aspect the present invention provides a system for enabling anonymous competition entry, the system including: a sensing device configured to: sense machine-readable coded data from a form as the sensing device is used to interact with the form; and generate interaction data representing the interaction of the sensing device with the coded data; and a computer system configured and programmed to: receive the interaction data; correlate the interaction data with a competition, and assign a competition alias ID to the interaction data, thereby enabling the anonymous competition entry.

In another aspect the present invention provides a system for anonymous competition entry via: a product label including human-readable information relating to the competition and machine-readable coded information relating to an identity of the label; and a sensing device configured to: sense at least some of the machine-readable coded data as the sensing device is moved across the product label; and generate interaction data based at least partly on the sensed coded data; the system including a computer system configured and programmed to:
 (a) receive the interaction data from the sensing device;
 (b) correlate the interaction data with a competition;
 (c) assign a competition alias ID to the interaction data; and
 (d) record an entry in the competition.

In a fourth aspect the present invention provides a method of: enabling an entrant to enter a competition; and limiting subsequent communication between a competition administrator and the entrant; via a sensing device interacting with machine-readable coded data on a printed competition entry form, the method comprising the steps, performed in a computer system, of:
 (a) receiving interaction data representing the interaction of the sensing device with the coded data, the interaction data enabling the competition entry to be electronically captured in the computer system;
 (b) transmitting the competition entry to the competition administrator; and
 (c) enabling transmission of up to a predetermined number of electronic messages from the competition administrator to the entrant.

In a further aspect the present invention provides a system for: enabling an entrant to enter a competition; and limiting subsequent communication between a competition administrator and the entrant; via a sensing device interacting with machine-readable coded data on a printed competition entry form, the system comprising a computer system configured and programmed to:
 (a) receive interaction data representing the interaction of the sensing device with the coded data, the interaction data enabling the competition entry to be electronically captured in the computer system;
 (b) transmit the competition entry to the competition administrator; and
 (c) enable transmission of up to a predetermined number of electronic messages from the competition administrator to the entrant.

In a fifth aspect the present invention provides a method of enabling redemption of a first coupon, the first coupon being printed on surface and including machine-readable coded data that can be sensed by a sensing device configured to generate interaction data based on the sensed coded data, the method comprising the steps, performed in a computer system, of: receiving the interaction data representing interaction of the sensing device with the coded data, the interaction data enabling the first coupon to be identified in the computer system; transmitting information identifying the first coupon to a coupon administrator that is configured to redeem the first coupon on the basis of the information.

In a further aspect the present invention provides a system for enabling redemption of a first coupon, the first coupon being printed on a surface and including machine-readable coded data that can be sensed by a sensing device configured to generate interaction data based on the sensed coded data, the system including a computer system programmed and configured to: receive the interaction data representing interaction of the sensing device with the coded data, the interaction data enabling the first coupon to be identified in the computer system; transmit information identifying the first coupon to a coupon administrator that is configured to redeem the first coupon on the basis of the information.

In a sixth aspect the present invention provides a method of enabling anonymous electronic redemption of a token printed as part of a product label, the product label including machine-readable coded data, the method including the steps, performed in a computer system, of: receiving interaction data representing interaction of a sensing device with the coded data, the interaction data enabling electronic capture of: token data of the token; and a product identifier associated with the product label; assigning an alias ID to the token data; and transmitting the token data, the product identifier and the alias ID to a token administrator configured to redeem the token electronically.

In a further aspect the present invention provides a method of enabling a user to anonymously redeem a token via interaction of a sensing device with a product label, the product label including human-readable information relating to the token and machine-readable coded data relating to an identity of the label, the method comprising the steps of: sensing, while the user responds to the human-readable information by interacting drawing on the label with the sensing device, at least some of the coded data with the sensing device; generating, in the sensing device, interaction data comprising an identity of the label and a position of the sensing device relative to the coded data, the interaction data being based at least partially on the sensed coded data; and sending, to a computer system, the interaction data for enabling the computer system to transmit the interaction data to a competition administrator that correlates the interaction data with the token offer and records a token redemption, wherein the computer system is configured to transmit the token offer to the competition administrator in such a way that the user remains anonymous with respect to the competition administrator.

In a further aspect the present invention provides a system for enabling anonymous electronic redemption of a token on a product label, via a sensing device configured to sense coded data from the product label and generate interaction data representing the interaction of the sensing device with the coded data, the system including a computer system configured and programmed to:
receive the interaction data;
correlate the interaction data with a token offer and a product identifier;
assign an alias ID to the token data; and
transmit the token data, the product identifier and the alias ID to a token administrator configured to redeem the token electronically.

In another aspect the present invention provides a system for enabling anonymous and electronic redemption of a token forming part of a product label, the product label including human-readable information relating to the token and machine-readable coded information relating to an identity of the label, the system comprising a sensing device configured to: sense at least some of the coded data while a user responds to the human-readable information by interacting with the label; generate interaction data comprising an identity of the label and a position of the sensing device relative to the coded data; send, to a computer system, the interaction data for enabling the computer system to transmit the interaction data to a competition administrator that correlates the interaction data with the token offer and records a token redemption, wherein the computer system is configured to transmit the token offer to the competition administrator in such a way that the user remains anonymous with respect to the competition administrator.

In a seventh aspect the present invention provides a method of enabling electronic redemption a plurality of tokens, wherein each the plurality of tokens is disposed on a product label and includes coded data that can be used to determine a unique product identifier of the product label with which it is associated, the method including the steps of:
using a sensing device, and for each of the plurality of tokens:
(a) generating interaction data by sensing at least some of the coded data of the token, the interaction data representing interaction of the sensing device with the coded data; and
(b) forwarding the interaction data to a computer system, for enabling the product identifier associated with the product label to be captured electronically in the computer system, thereby enabling the computer system to transmit further information to a token administrator; and
receiving token redemption information from the token administrator after a predetermined combination of the further information has been transmitted to the token administrator.

In a further aspect the present invention provides a method of enabling electronic redemption of a plurality of tokens, wherein each the plurality of tokens is disposed on a product label and includes coded data that can be used to determine a unique product identifier of the product label with which it is associated, and wherein a sensing device has been used, for each of the plurality of product labels, to:
(a) generate interaction data by sensing at least some of the coded data of the token, the interaction data representing interaction of the sensing device with the coded data; and
(b) forward the interaction data to a computer system;
the method including the steps, performed in the computer system, of:
receiving a set of the interaction data corresponding to each of the labels;
generating further information based on each set of the interaction data, the further information identifying a token administrator; and
transmitting at least some of the further information to the token administrator for enabling determination of when a predetermined combination of tokens has been interacted with using the sensing device.

In another aspect the present invention provides a system for enabling electronic redemption of a plurality of tokens, wherein each of the plurality of tokens is disposed on a product label and includes coded data that can be used to determine a unique product identifier of the label, the system including:
a sensing device configured to, as it used to interact with each of the plurality of tokens:
(a) generate interaction data by sensing at least some of the coded data of the token, the interaction data representing interaction of the sensing device with the coded data; and
(b) forward the interaction data to a computer system, for enabling the product identifier associated with the product label to be captured electronically in the computer system, thereby enabling the computer system to transmit further information to a token administrator; and
receiving token redemption information from the token administrator after a predetermined combination of the further information has been transmitted to the token administrator.

In a further aspect the present invention provides a system for enabling anonymous redemption of a plurality of tokens, wherein each the plurality of tokens is disposed on a product label and includes coded data that can be used to determine a unique product identifier of the product label with which it is associated, and wherein a sensing device has been used, for each of the plurality of product labels, to:
(a) generate interaction data by sensing at least some of the coded data of the token, the interaction data representing interaction of the sensing device with the coded data; and
(b) forward the interaction data to a computer system;
the system including a computer system configured and programmed to:
receive a set of the interaction data corresponding to each of the labels;
generate further information based on each set of the interaction data, the further information identifying a token administrator; and
transmit at least some of the further information to the token administrator for enabling determination of when a predetermined combination of tokens has been interacted with using the sensing device.

In another aspect the present invention provides a method of enabling electronic redemption of a plurality of tokens, wherein each the plurality of tokens is disposed on a product label and includes coded data that can be used to determine a unique product identifier of the product label with which it is associated, and wherein a sensing device has been used, for each of the plurality of product labels, to:

(a) generate interaction data by sensing at least some of the coded data of the token, the interaction data representing interaction of the sensing device with the coded data; and (b) forward the interaction data to a computer system;

the method including the steps, performed in a token administrator, of:

receiving further information based on each set of the interaction data;

determining when a predetermined combination of tokens has been interacted with using the sensing device; and outputting an indication that the predetermined combination has been interacted with.

In an eighth aspect the present invention provides a method of enabling submission of form data to an application via a printed form, the printed form having coded data readable by a sensing device as the sensing device is used to interact with the form, the method including the steps, performed in a computer system, of:

receiving, from the sensing device: interaction data representing interaction of the sensing device with the coded data, the interaction data enabling the form data to be electronically captured in the computer system; and a sensing device ID of the sensing device;

allocating a temporary registration to the sensing device ID or to a user associated with the sensing device, the registration including a return telecommunication address associated with the sensing device ID or the user;

transmitting the form data to the application.

In a further aspect the present invention provides a method of enabling submission of form data to an application via a printed form, the printed form including human-readable information relating to the form and machine-readable coded data relating to an identity of the form, the method including the steps, performed in a computer system, of:

receiving, from the sensing device, interaction data and sensing device identification information, the interaction data including the identity of the form and having been generated by the sensing device based on coded data sensed in response to the sensing device being used to interact with the label;

allocating, on the basis of the sensing device identification information, a temporary registration to the sensing device or a user associated with the sensing device, the registration including a return telecommunication address associated with the sensing device or the user; and transmitting at least some of the interaction data to the application.

In another aspect the present invention provides a system for enabling submission of form data to an application, the system comprising:

a sensing device having a sensing device ID, the sensing device being configured to sense coded data on a form and generate interaction data representing interaction of the sensing device with the coded data, and having a transmitter for transmitting the sensing device ID and interaction data to a computer system; and a computer system configured and programmed to:

receive the sensing device ID and the interaction data;

allocate a temporary registration to the sensing device ID or to a user associated with the sensing device, the registration including a return telecommunication address associated with the sensing device ID or the user;

transmit the form data to the application.

In a further aspect the present invention provides a system for enabling submission of form data via a form that includes machine-readable coded information relating to an identity of the label, a sensing device having sensed at least some of the machine-readable coded data as the sensing device was used to interact with the product label and having generated interaction data based at least partly on the sensed coded data, the interaction data including at least the identity, the sensing device including a sensing device ID;

the system comprising a computer system configured and programmed to:

receive the sensing device ID and the interaction data;

allocate a temporary registration to the sensing device ID or to a user associated with the sensing device, the registration including a return telecommunication address associated with the sensing device ID or the user;

transmit the form data to the application.

In a ninth aspect the present invention provides a method of validating entry to a competition via interaction of a sensing device with a printed competition entry form comprising coded data indicative of a unique product identifier, the method comprising the steps, performed in a computer system, of:

receiving, from the sensing device, interaction data representing interaction of the sensing device with the coded data, the interaction data including at least the unique product identifier and enabling a competition entry to be electronically captured in the computer system; and transmitting the product identifier and the competition entry to a competition administrator for validation of the competition entry at the competition administrator by verification of the product identifier.

In a further aspect the present invention provides a method of enabling validation of a competition entry via a product label, the product label including human-readable information relating to a competition and machine-readable coded data relating to an identity of the label and including a product identifier, the method including the steps of:

receiving, in a computer system, interaction data from the sensing device, the interaction data including the product identifier and movement data generated by the sensing device in response to the sensing device being used to draw or write on the product label, the interaction data having been generated by sensing at least some of the machine-readable coded data; and transmitting the interaction data to a competition administrator for validating the competition entry by verifying the product identification.

In another aspect the present invention provides a system for validating entry to a competition via interaction of a sensing device with a printed competition entry form comprising coded data indicative of a unique product identifier, the system including a computer system configured and programmed to:

receive, from the sensing device, interaction data representing interaction of the sensing device with the coded data, the interaction data including at least the unique product identifier and enabling a competition entry to be electronically captured in the computer system; and transmit the product identifier and the competition entry to a competition administrator for validation of the competition entry at the competition administrator by verification of the product identification.

In a further aspect the present invention provides a system for enabling validation of a competition entry via a product label, the product label including human-readable information relating to a competition and machine-readable coded data identifying a product identifier via a product identifier, the system including a computer system configured and programmed to:

receive interaction data from the sensing device, the interaction data including the product identifier and movement data generated by the sensing device in response to the sensing device being used to draw or write on the product label, the interaction data having been generated by sensing at least some of the machine-readable coded data; and transmit the interaction data to a competition administrator for validating the competition entry by verifying the product identification.

BRIEF DESCRIPTION OF DRAWINGS

Embodiments of the invention will now be described with reference to the accompanying drawings, in which:

FIG. 1 is a schematic of a relationship between a sample printed netpage and its online page description;

FIG. 5 shows a competition entry form;

FIG. 6 shows a competition details form;

FIG. 7 shows an entry confirmation message;

FIG. 8 shows an entry status message;

FIG. 9 shows a prize claim form;

FIG. 15 shows an instant win entry form;

FIG. 16 shows an instant win prize claim;

FIG. 32 shows a temporary user class diagram

DETAILED DESCRIPTION OF EMBODIMENTS

Figure 2:
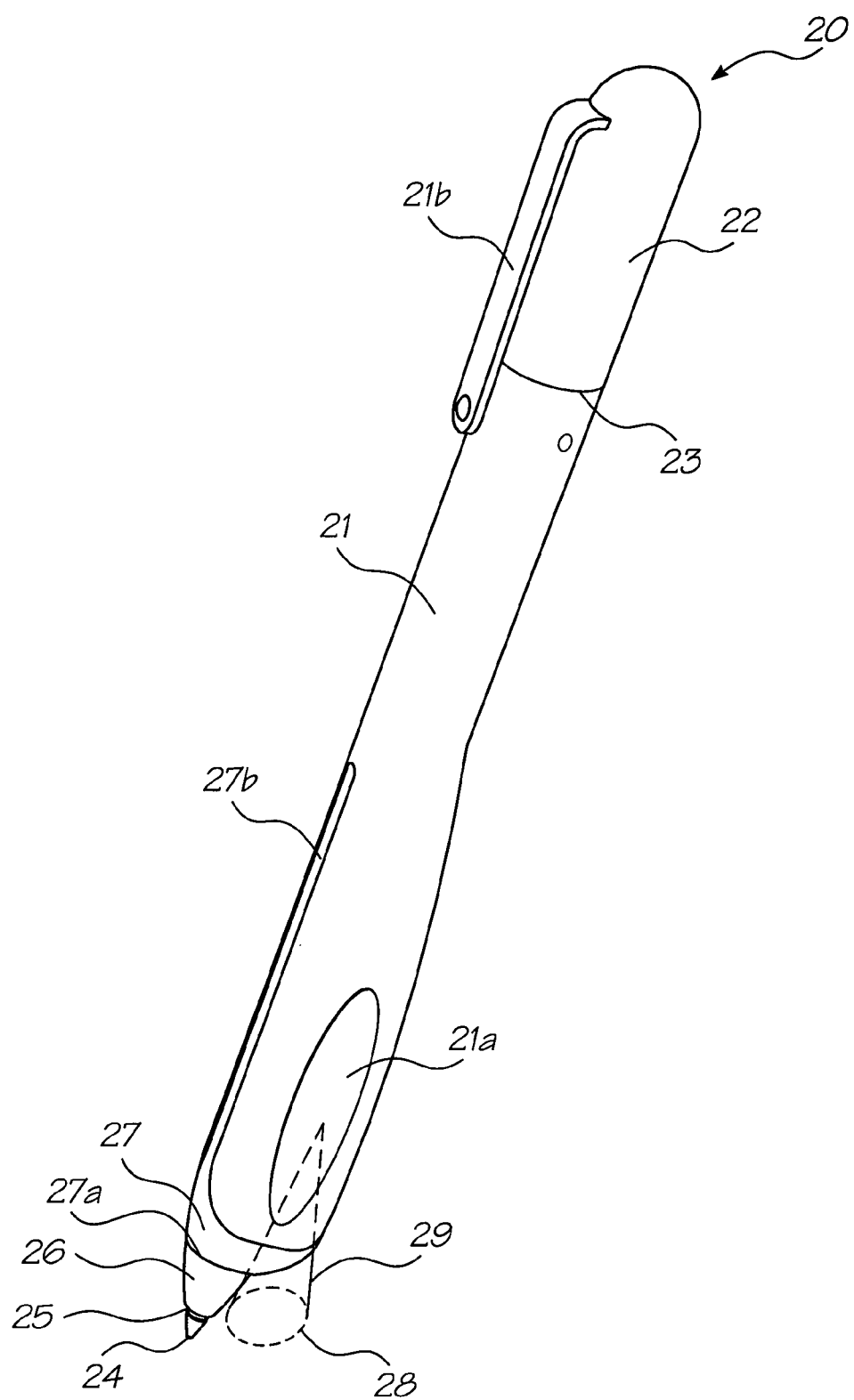
FIG. 2 is a perspective view of a netpage pen and its associated tag-sensing field-of-view cone.

The invention employs an optical tagging technology that has been designated "Hyperlabel™". Hyperlabel™ is an optical tagging technology designed for uniquely identifying individual product items in the global supply chain. Hyperlabel™ consists of covering a large portion of the surface of a product item with optically-readable invisible tags. Hyperlabel™ tags are applied during product manufacturer and/or packaging.

In the preferred embodiment, the invention is configured to work with the netpage networked computer system. It will be appreciated that not every implementation will necessarily embody all or even most of the specific details and extensions discussed below in relation to the basic system. However, the system is described in its most complete form to reduce the need for external reference when attempting to understand the context in which the preferred embodiments and aspects of the present invention operate.

In the netpage system a surface such as a page is printed with a collection of invisible tags, each tag a couple of millimeters in diameter. A tag uniquely identifies the surface on which it appears, as well as its own position on the surface. The collection of tags on a surface thus defines a high-precision coordinate grid identifiably tied to the particular surface. When read by a suitable sensing device operated by a user, the tags allow the sensing device to determine its own movement relative to the surface. When coupled with a description of the visible (and typically printed) content of the surface, the description allows the movement to be interpreted relative to the visible surface content seen by the user, e.g. as a "press" on the visible representation of a "button". The tags are printed using an infrared ink invisible to humans, while visible surface content is printed using colored inks which are transparent in the infrared part of the spectrum.

For example, where a "print" function is implemented in the earlier embodiment, it is necessary to obtain a position of the tag (or more precisely, a position of the sensing device relative to the tag) and the identity of the page encoded by the tag. This information is then used in conjunction with a page description, usually by a remote server, to determine that a "print a particular document" function is associated with the position of the sensing device on that particular page.

However, in an alternative embodiment, the function is encoded directly and completely into the tag. For example, the tag can explicitly encode the instruction to "print a particular document" directly into the tag's data, thereby avoiding the need for a translation of the page identity and sensing device position via the page description. This embodiment has some advantages, including the fact that there is no need for an external lookup, and the fact that the same tags can be used in different documents to perform the same function. However, in some circumstances this embodiment may be considered somewhat limiting due to the absence of location and page information. For example, an absence of location information means that handwriting capture cannot be performed using the tags as reference point relative to which the handwriting is captured.

The netpage sensing device operated by the user may be in the form of a pen with a marking nib, and the movement of the pen may be interpreted as form input, such as handwritten text. Because the netpage system captures marking input, it crucially distinguishes between different instances of the same surface content (such as a form).

It will be appreciated that it is not necessary to include a marking nib in cases where it is not necessary or desirable for a document to be marked. For example, a nib-less sensing device can be used as a non-marking pointer. In its simplest form, this embodiment is just a point-and-click device, designed to capture (for example) only a single frame of tag information for decoding in response to the user designating a location on a Netpage page. As such, this pointer cannot be used for handwriting capture, or for other applications in which movement of the sensing device over time must be tracked.

Alternatively, the pointer can be otherwise identical to the version with the nib, enabling capture of movement of the sensing device without marking of the page.

Using an invisible (e.g. infrared) tagging scheme to uniquely identify a product item has the significant advantage that it allows the entire surface of a product to be tagged, or a significant portion thereof, without impinging on the graphic design of the product's packaging or labelling. If the entire product surface is tagged, then the orientation of the product doesn't affect its ability to be scanned, i.e. a significant part of the line-of-sight disadvantage of a visible bar code is eliminated. Furthermore, if the tags are compact and massively replicated, then label damage no longer prevents scanning.

Hyperlabel™, then, consists of covering a large proportion of the surface of a product item with optically-readable invisible tags. When the tags utilise reflection or absorption in the infrared spectrum they are also referred to as infrared identification (IRID) tags. Each Hyperlabel™ tag uniquely identifies the product item on which it appears. The tag may directly encode the electronic product code (e.g. EPC) of the item, or may encode a surrogate ID which in turn identifies the product code via a database lookup. Each tag also optionally identifies its own position on the surface of the product item, to provide the downstream consumer benefits of netpage interactivity.

Hyperlabel™ tags are applied during product manufacture and/or packaging using digital printers. These may be add-on infrared printers which print the tags after the text and graphics have been printed by other means, or integrated color and infrared printers which print the tags, text and graphics simultaneously.

As illustrated in FIG. 1, a printed netpage 1 represents an interactive form that can be filled in by the user both physically, on the printed page, and "electronically", via communication between a sensing device (pen) and the netpage system. The example shows a "Request" form containing name and address fields and a submit button. The netpage consists of graphic data 2 printed using visible ink, and coded data 3 printed as a collection of tags 4 using invisible ink. The corresponding page description 5, stored on the netpage network, describes the individual elements of the netpage. In particular it describes the type and spatial extent (zone) of each interactive element (i.e. text field or button in the example), to allow the netpage system to correctly interpret input via the netpage. The submit button 6, for example, has a zone 7 which corresponds to the spatial extent of the corresponding graphic 8.

The active sensing device of the netpage system is typically a pen of the type shown in FIG. 2. The pen, generally designated by reference numeral 20, includes a housing 21 in the form of a plastics moulding defining an interior space for mounting the pen components. The pen top 22 is in operation rotatably mounted at one end 23 of the housing 21 to select a nib 24, which may be an ink cartridge nib or non-marking stylus, through open end 25 of a metal end piece 26. The metal end piece 26 is removable to enable ink cartridge replacement.

As described above, the inclusion of a marking nib is optional. It can either simply be omitted, or replaced with a non-marking nib to enable accurate visual and tactile feedback to the user regarding the position of the sensing device on the page. As mentioned, the sensing device can also operate in single (or low rate) frame capture such that continuous or frequent capture of movement of the sensing device relative to the page using the tags is not possible.

A semi-transparent cover 27 is secured to the opposite end of the housing 21. The cover 27 is also of moulded plastics, and is formed from semi-transparent material in order to enable the user to view the status of a tri-colour LED mounted within the housing 21. The cover 27 includes a main part 27a which substantially surrounds the end of the housing 21 and a projecting portion 27b which projects back from the main part 27a. A radio antenna is mounted behind the projecting portion 27b, within the housing 21.

An infrared LED is mounted within the housing 21 for projecting infrared radiation onto a surface 28. An infrared image sensor is mounted within the housing 21 with field of view 29 for receiving radiation reflected from the surface 28. A radio frequency chip, which includes an RF transmitter and RF receiver, and a controller chip for controlling operation of the pen 20, are also mounted within the housing.

Rubber grip pad 21a is provided towards the end of the housing 21 to assist gripping the pen 20, and top 22 also includes a clip 21b for clipping the pen 20 to a pocket.

The pen 20, uses the embedded controller, to capture and decode IR position tags from a page via the image sensor. The image sensor is a solid-state device provided with an appropriate filter to permit sensing at only near-infrared wavelengths. The system is able to sense when the nib is in contact with the surface, and the pen is able to sense tags at a sufficient rate to capture human handwriting (i.e. at 200 dpi or greater and 100 Hz or faster). Interaction data captured by the pen is, encrypted and wirelessly transmitted to a base station, the base station interprets the data with respect to the (known) page structure.

The preferred embodiment of the netpage pen operates both as a normal marking ink pen and as a non-marking stylus. The marking aspect, however, is not necessary for using the netpage system as a browsing system, such as when it is used as an Internet interface. Each netpage pen is registered with the netpage system and has a unique pen ID.

When either nib is in contact with a netpage, the pen determines its position and orientation relative to the page. The nib is attached to a force sensor, and the force on the nib is interpreted relative to a threshold to indicate whether the pen is "up" or "down". This allows an interactive element on the page to be 'clicked' by pressing with the pen nib, in order to request, say, information from a network. Furthermore, the force is captured as a continuous value to allow, say, the full dynamics of a signature to be verified.

The pen determines the position and orientation of its nib on the netpage by imaging, in the infrared spectrum, the area 28 of the page in the vicinity of the nib. It decodes the nearest tag and computes the position of the nib relative to the tag from the observed perspective distortion on the imaged tag and the known geometry of the pen optics. Although the position resolution of the tag may be low, because the tag density on the page is inversely proportional to the tag size, the adjusted position resolution is quite high, exceeding the minimum resolution required for accurate handwriting recognition.

Pen actions relative to a netpage are captured as a series of strokes. A stroke consists of a sequence of time-stamped pen positions on the page, initiated by a pen-down event and completed by the subsequent pen-up event. A stroke is also tagged with a page ID of the netpage whenever the page ID changes, which, under normal circumstances, is at the commencement of the stroke.

A sequence of captured strokes is referred to as digital ink. Digital ink forms the basis for the digital exchange of data, drawings and handwriting, for online recognition of handwriting, and for online verification of signatures.

The pen is wireless and transmits digital ink to the base station, which may be a Personal Computer or a mobile phone, for example, via a short-range radio link. The transmitted digital ink is encrypted for privacy and security and packetized for efficient transmission, but is always flushed on a pen-up event to ensure timely processing.

When the pen is out-of-range of a base station it buffers digital ink in internal memory, which has a capacity of over ten minutes of continuous handwriting. When the pen is once again within range of a base station, it transfers any buffered digital ink.

A pen can be registered with any number of base stations, but because all state data resides in netpages both on paper and on the network, it is largely immaterial which base station a pen is communicating with at any particular time.

A form defines a collection of related input fields used to capture a related set of inputs through a printed netpage. A form allows a user to submit one or more parameters to an application software program running on a server.

Figure 24:
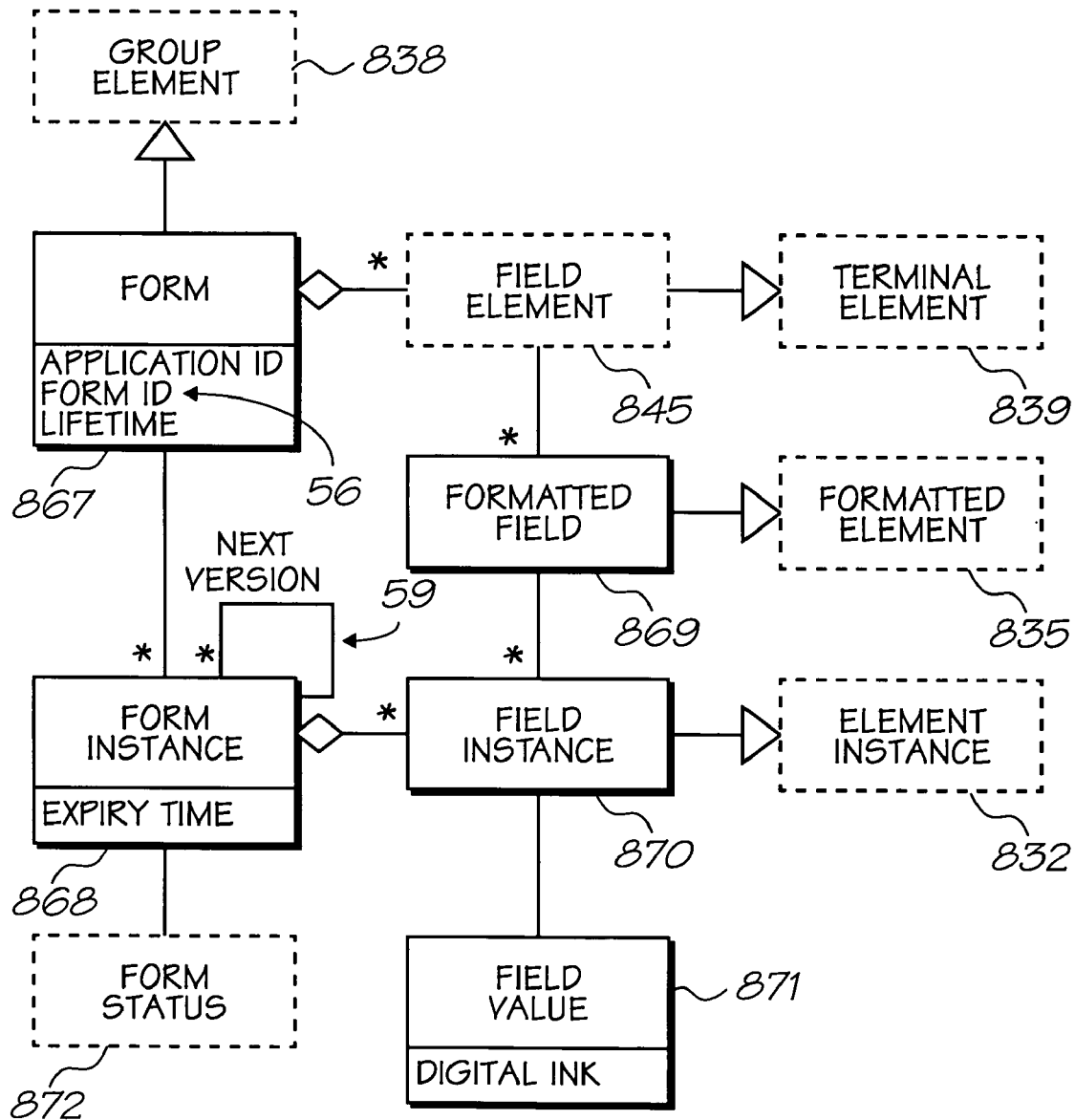
FIG. 24 shows a schematic view of a form class diagram.

A form 867 is a group element 838 in the document hierarchy. It ultimately contains a set of terminal field elements 839. A form instance 868 represents a printed instance of a form. It consists of a set of field instances 870 which correspond to the field elements 845 of the form. Each field instance has an associated value 871, whose type depends on the type of the corresponding field element. Each field value records input through a particular printed form instance, i.e. through one or more printed netpages. The form class diagram is shown in FIG. 24.

Each form instance has a status 872 which indicates whether the form is active, frozen, submitted, void or expired. A form is active when first printed. A form becomes frozen once it is signed. A form becomes submitted once one of its submission hyperlinks has been activated, unless the hyperlink has its "submit delta" attribute set. A form becomes void when the user invokes a void form, reset form or duplicate form page command. A form expires when the time the form has been active exceeds the form's specified lifetime. While the form is active, form input is allowed. Input through a form which is not active is instead captured in the background field 832 of the relevant page instance. When the form is active or frozen, form submission is allowed. Any attempt to submit a form when the form is not active or frozen is rejected, and instead elicits form status report.

Each form instance is associated (at reference numeral 59) with any form instances derived from it, thus providing a version history. This allows all but the latest version of a form in a particular time period to be excluded from a search.

Figure 25:
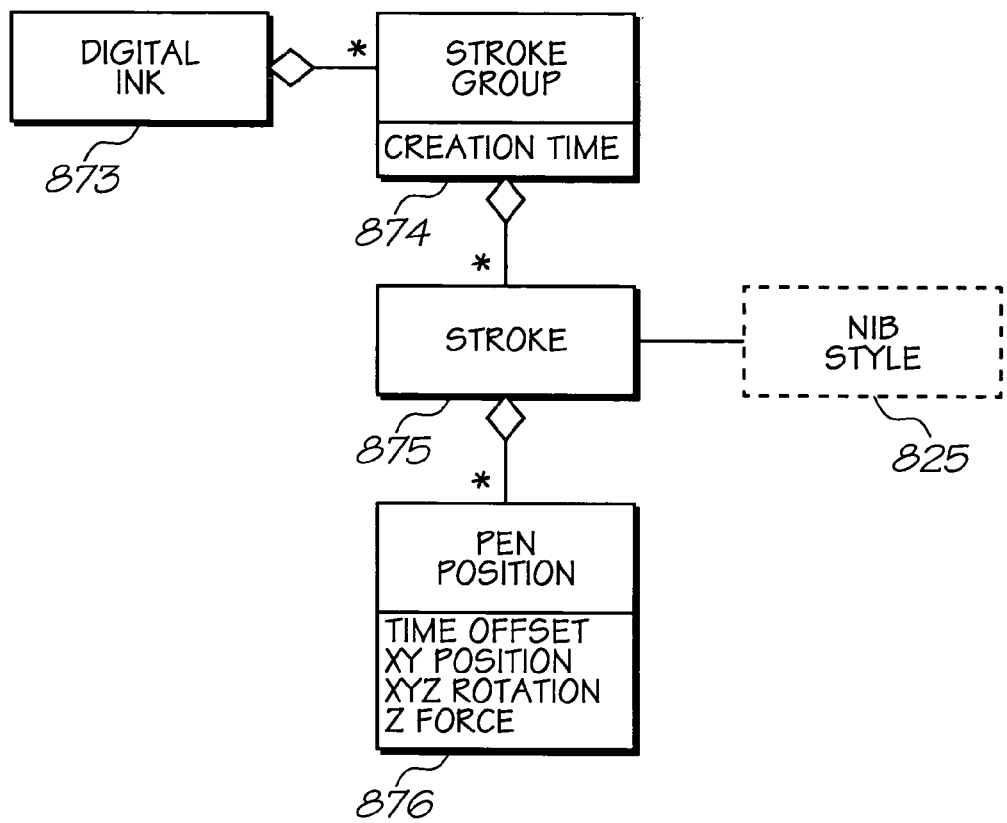
FIG. 25 shows a schematic view of a digital ink class diagram.

All input is captured as digital ink. Digital ink 873 consists of a set of timestamped stroke groups 874, each of which consists of a set of styled strokes 875. Each stroke consists of a set of timestamped pen positions 876, each of which also includes pen orientation and nib force. The digital ink class diagram is shown in FIG. 25.

Figure 26:
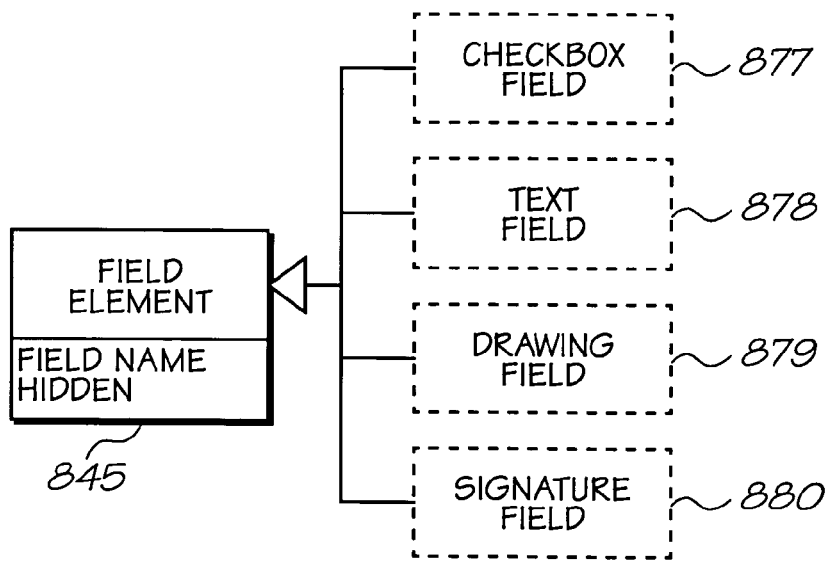
FIG. 26 shows a schematic view of a field element specialization class diagram.

A field element 845 can be a checkbox field 877, a text field 878, a drawing field 879, or a signature field 880. The field element class diagram is shown in FIG. 26. Any digital ink captured in a field's zone is assigned to the field.

Figure 27:
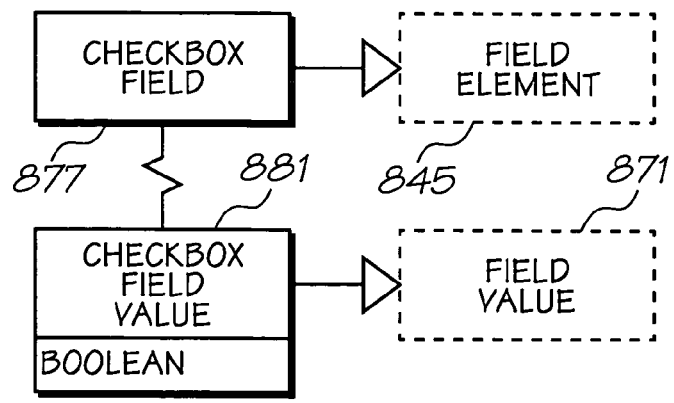
FIG. 27 shows a schematic view of a checkbox field class diagram.

A checkbox field has an associated boolean value 881, as shown in FIG. 27. Any mark (a tick, a cross, a stroke, a fill zigzag, etc.) captured in a checkbox field's zone causes a true value to be assigned to the field's value.

Figure 28:
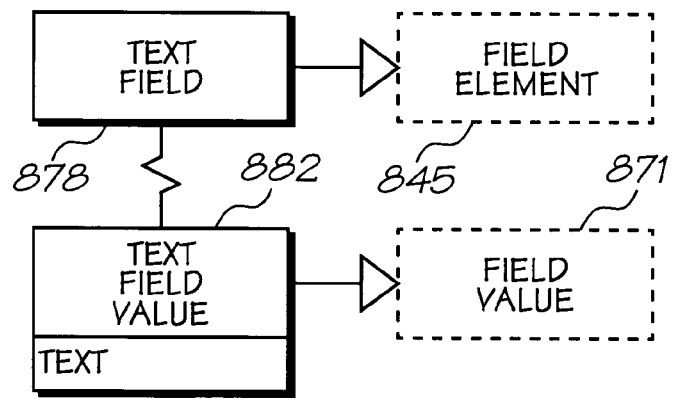
FIG. 28 shows a schematic view of a text field class diagram.

A text field has an associated text value 882, as shown in FIG. 28. Any digital ink captured in a text field's zone is automatically converted to text via online handwriting recognition, and the text is assigned to the field's value. Online handwriting recognition is well-understood (see, for example, Tappert, C., C. Y. Suen and T. Wakahara, "The State of the Art in On-Line Handwriting Recognition", IEEE Transactions on Pattern Analysis and Machine Intelligence, Vol. 12, No. 8, Aug. 1990, the contents of which are herein incorporated by cross-reference).

Figure 29:
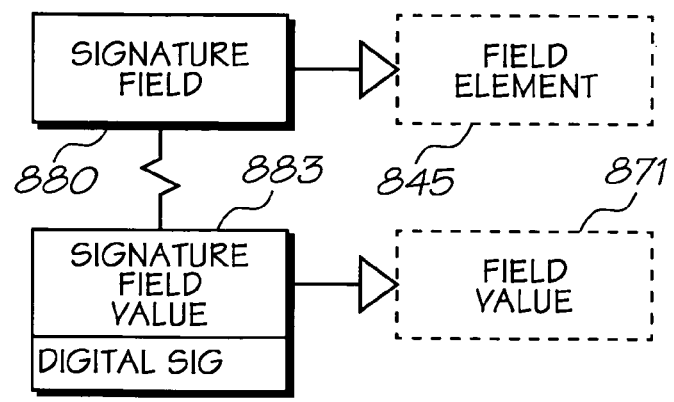
FIG. 29 shows a schematic view of a signature field class diagram.

A signature field has an associated digital signature value 883, as shown in FIG. 29. Any digital ink captured in a signature field's zone is automatically verified with respect to the identity of the owner of the pen, and a digital signature of the content of the form of which the field part is generated and assigned to the field's value. The digital signature is generated using the pen user's private signature key specific to the application which owns the form. Online signature verification is well-understood (see, for example, Plamondon, R. and G. Lorette, "Automatic Signature Verification and Writer Identification—The State of the Art", Pattern Recognition, Vol. 22, No. 2, 1989, the contents of which are herein incorporated by cross-reference).

A field element is hidden if its "hidden" attribute is set. A hidden field element does not have an input zone on a page and does not accept input. It can have an associated field value which is included in the form data when the form containing the field is submitted.

"Editing" commands, such as strike-through indicating deletion, can also be recognized in form fields.

Because the handwriting recognition algorithm works "online" (i.e. with access to the dynamics of the pen movement), rather than "offline" (i.e. with access only to a bitmap of pen markings), it can recognize run-on discretely-written characters with relatively high accuracy, without a writer-dependent training phase. A writer-dependent model of handwriting is automatically generated over time, however, and can be generated up-front if necessary.

Digital ink, as already stated, consists of a sequence of strokes. Any stroke which starts in a particular element's zone is appended to that element's digital ink stream, ready for interpretation. Any stroke not appended to an object's digital ink stream is appended to the background field's digital ink stream.

Digital ink captured in the background field is interpreted as a selection gesture. Circumscription of one or more objects is generally interpreted as a selection of the circumscribed objects, although the actual interpretation is application-specific.

Table 1 summarises these various pen interactions with a netpage.

TABLE 1

Summary of pen interactions with a netpage

| Object | Type | Pen input | Action |
|---|---|---|---|
| Hyperlink | General | Click | Submit action to application |
| | Form | Click | Submit form to application |
| | Selection | Click | Submit selection to application |
| Form field | Checkbox | Any mark | Assign true to field |
| | Text | Handwriting | Convert digital ink to text; assign text to field |
| | Drawing | Digital ink | Assign digital ink to field |
| | Signature | Signature | Verify digital ink signature; generate digital signature of form; assign digital signature to field |
| None | — | Circumscription | Assign digital ink to current selection |

The system maintains a current selection for each pen. The selection consists simply of the most recent stroke captured in the background field. The selection is cleared after an inactivity timeout to ensure predictable behavior.

The raw digital ink captured in every field is retained on the netpage page server and is optionally transmitted with the form data when the form is submitted to the application. This allows the application to interrogate the raw digital ink should it suspect the original conversion, such as the conversion of handwritten text. This can, for example, involve human intervention at the application level for forms which fail certain application-specific consistency checks. As an extension to this, the entire background area of a form can be designated as a drawing field. The application can then decide, on the basis of the presence of digital ink outside the explicit fields of the form, to route the form to a human operator, on the assumption that the user may have indicated amendments to the filled-in fields outside of those fields.

Figure 30:
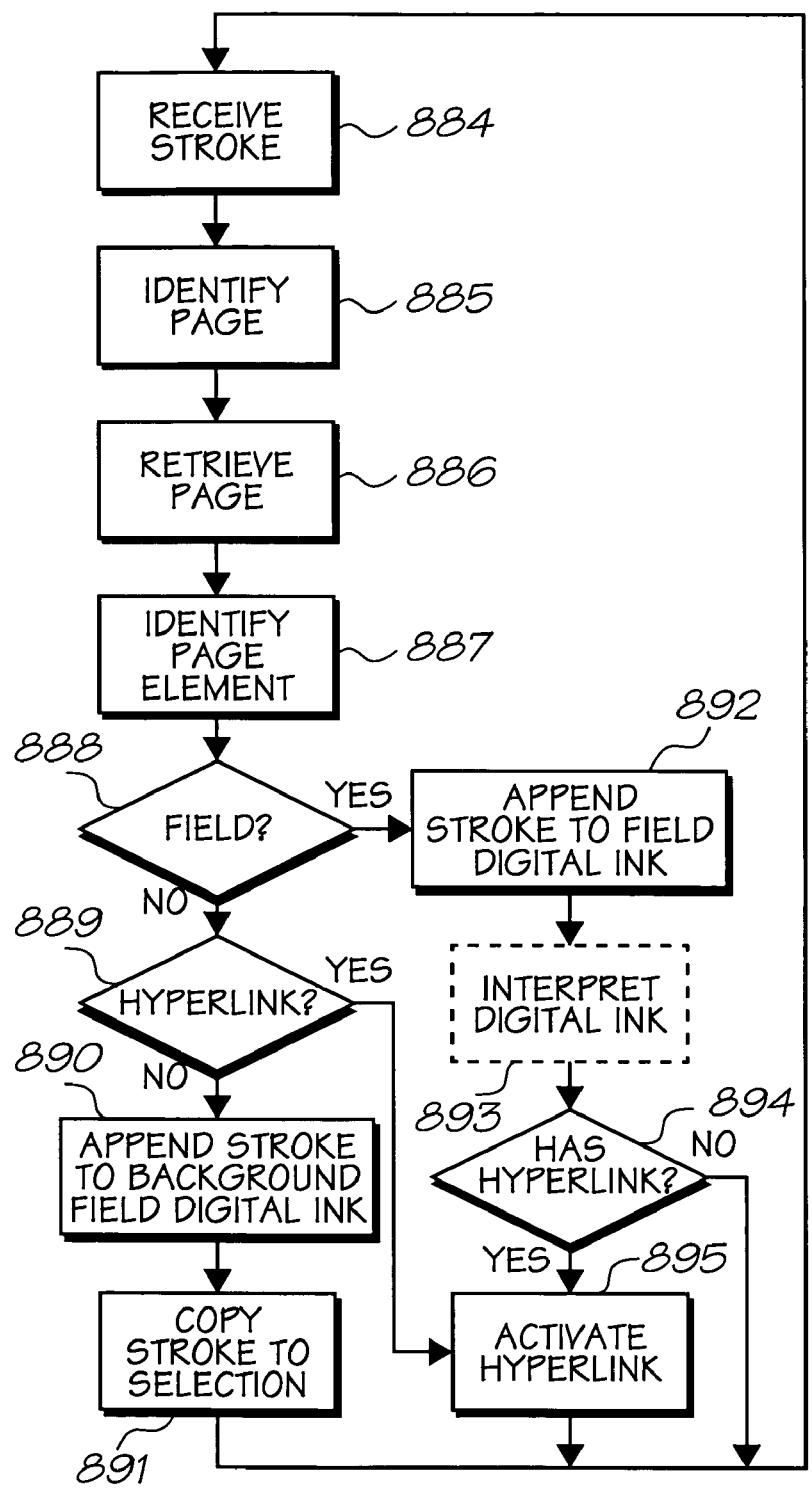
FIG. 30 shows a flowchart of an input processing algorithm.

FIG. 30 shows a flowchart of the process of handling pen input relative to a netpage. The process consists of receiving (at 884) a stroke from the pen; identifying (at 885) the page instance to which the page ID 50 in the stroke refers; retrieving (at 886) the page description 5; identifying (at 887) a formatted element 835 (FIG. 24) whose zone the stroke intersects; determining (at 888) whether the formatted element corresponds to a field element, and if so appending (at 892) the received stroke to the digital ink of the field value 871 (FIG. 24), interpreting (at 893) the accumulated digital ink of the field, and determining (at 894) whether the field is part of a hyperlinked group and if so activating (at 895) the associated hyperlink; alternatively determining (at 889) whether the formatted element corresponds to a hyperlink element and if so activating (at 895) the corresponding hyperlink; alternatively, in the absence of an input field or hyperlink, appending (at 890) the received stroke to the digital ink of the background field; and copying (at 891) the received stroke to the current selection of the current pen, as maintained by the registration server.

Figure 30A:
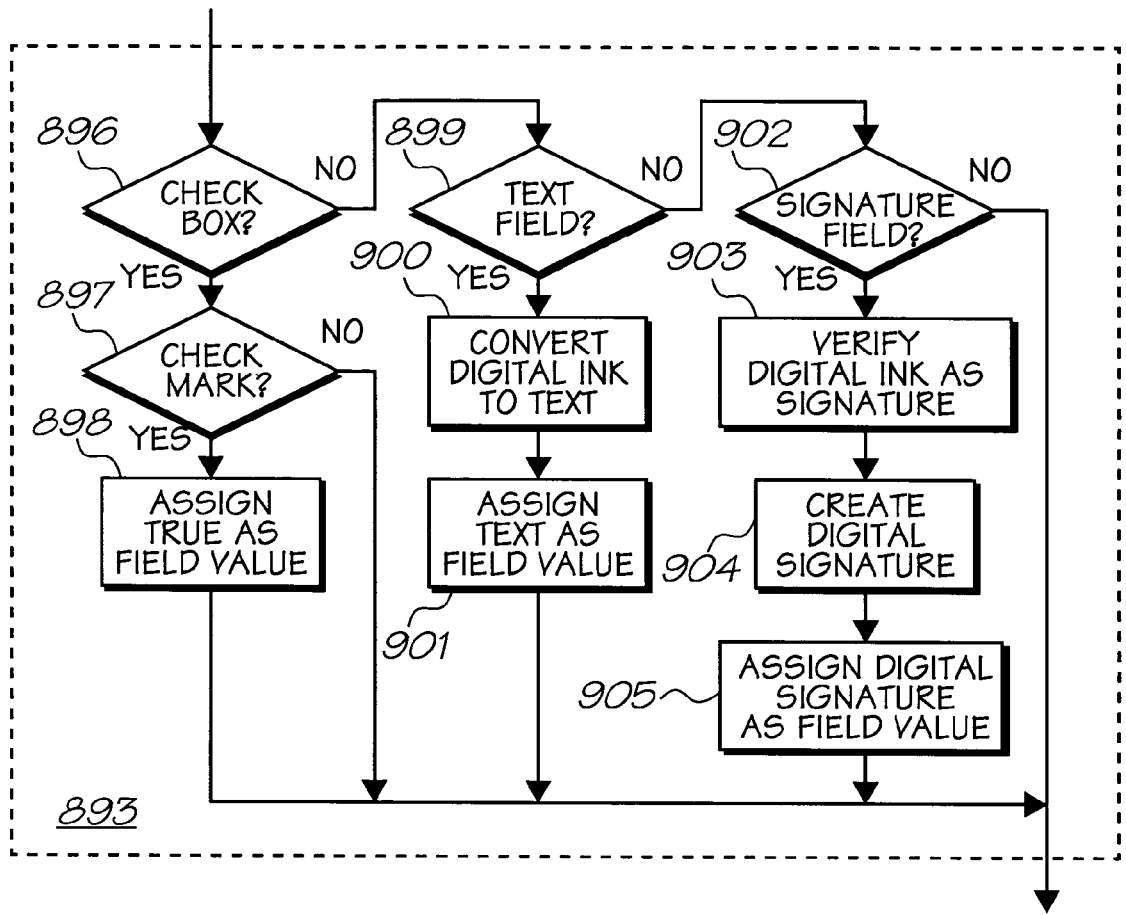
FIG. 30*a* shows a detailed flowchart of one step of the flowchart of FIG. 30.
Figure 31:
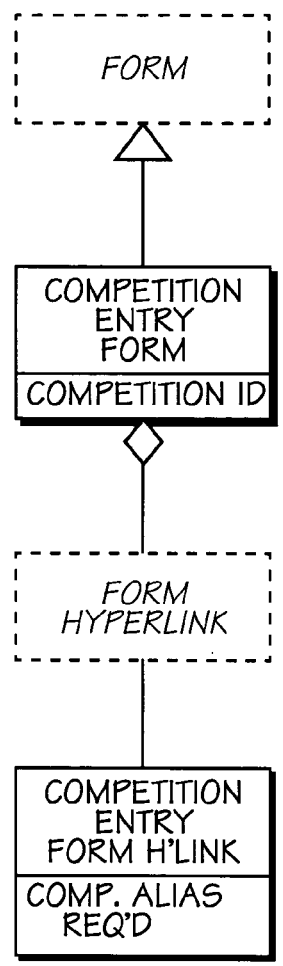
FIG. 31 shows a competition entry form class diagram

FIG. 30a shows a detailed flowchart of step 893 in the process shown in FIG. 30, where the accumulated digital ink of a field is interpreted according to the type of the field. The process consists of determining (at 896) whether the field is a checkbox and (at 897) whether the digital ink represents a checkmark, and if so assigning (at 898) a true value to the field value; alternatively determining (at 899) whether the field is a text field and if so converting (at 900) the digital ink to computer text, with the help of the appropriate registration server, and assigning (at 901) the converted computer text to the field value; alternatively determining (at 902) whether the field is a signature field and if so verifying (at 903) the digital ink as the signature of the pen's owner, with the help of the appropriate registration server, creating (at 904) a digital signature of the contents of the corresponding form, also with the help of the registration server and using the pen owner's private signature key relating to the corresponding application, and assigning (at 905) the digital signature to the field value.

Hyperlink Activation Protocol

Figure 34:
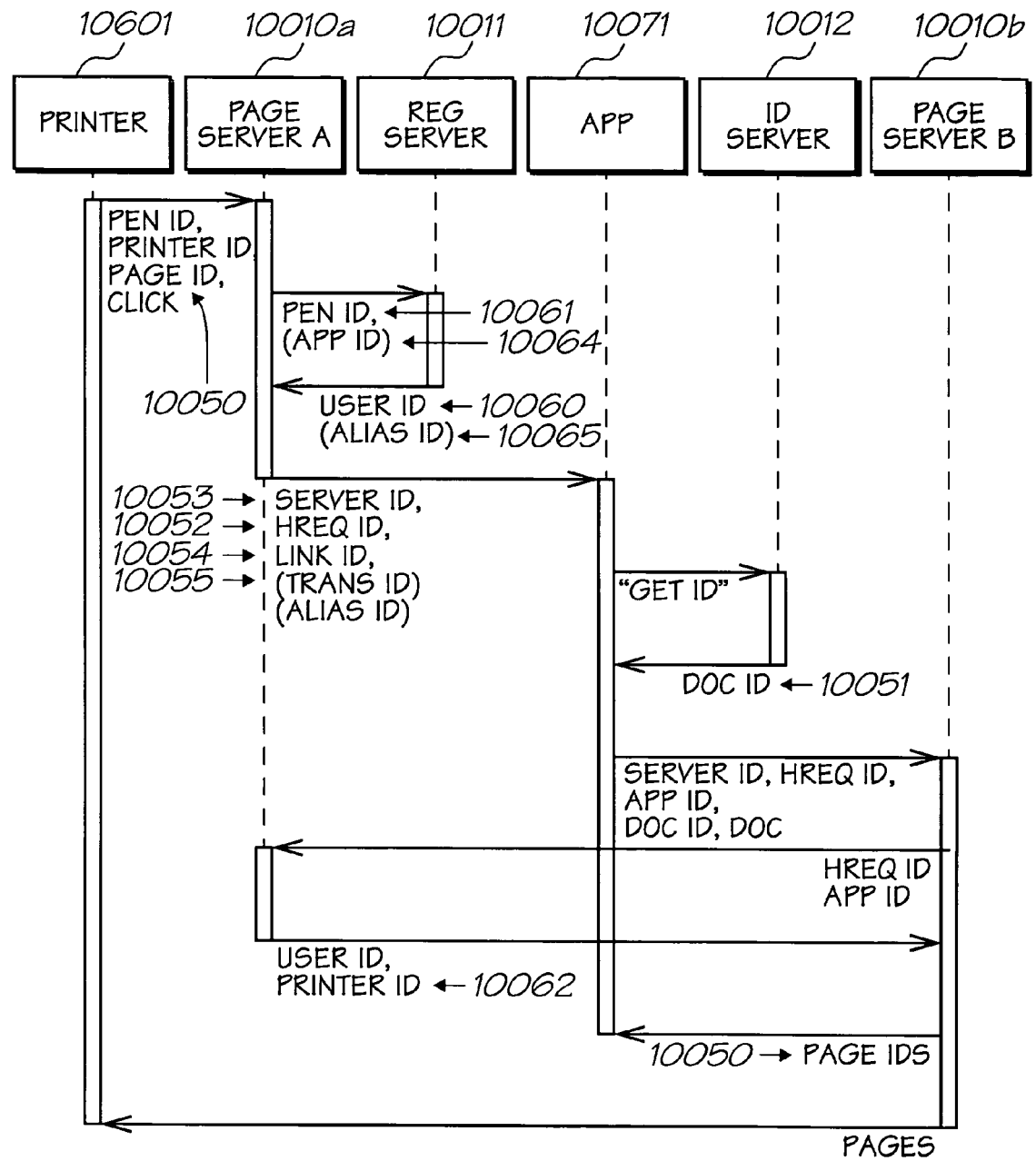
FIG. 34 shows a schematic view of a hyperlink activation protocol.

A preferred embodiment of a hyperlink activation protocol is shown in FIG. 34.

When a user clicks on a netpage with a netpage pen, the pen communicates the click to the nearest netpage printer 10601. The click identifies the page and a location on the page. The printer already knows the ID 1061 of the pen from the pen connection protocol.

The printer determines, via the DNS, the network address of the page server 10010 a handling the particular page ID 10050. The address may already be in its cache if the user has recently interacted with the same page. The printer then forwards the pen ID, its own printer ID 10062, the page ID and click location to the page server.

The page server loads the page description identified by the page ID and determines which input element's zone, if any, the click lies in. Assuming the relevant input element is a hyperlink element, the page server then obtains the associated application ID 10064 and link ID 10054, and determines, via the DNS, the network address of the application server hosting the application 10071.

Figure 33:
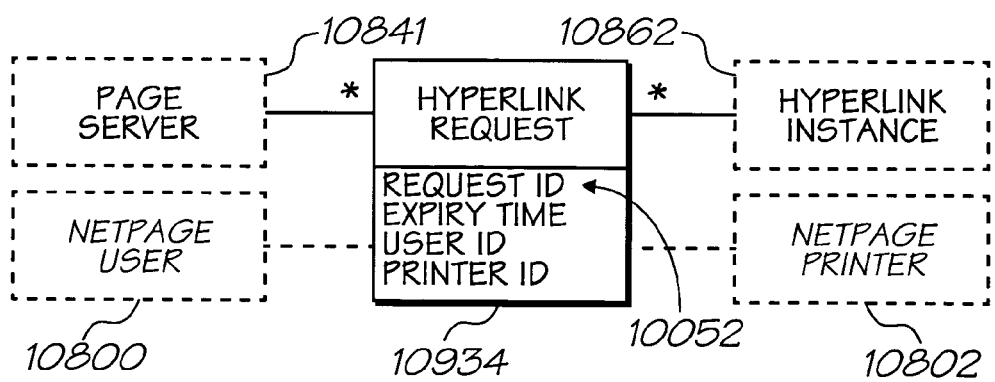
FIG. 33 shows a schematic view of a hyperlink request class diagram.

The page server uses the pen ID 10061 to obtain the corresponding user ID 10060 from the registration server 10011, and then allocates a globally unique hyperlink request ID 10052 and builds a hyperlink request 10934. The hyperlink request class diagram is shown in FIG. 33. The hyperlink request records the IDs of the requesting user and printer, and identifies the clicked hyperlink instance 10862. The page server then sends its own server ID 10053, the hyperlink request ID, and the link ID to the application.

The application produces a response document according to application-specific logic, and obtains a document ID 10051 from an ID server 10012. It then sends the document to the page server 10010b responsible for the document's newly allocated ID, together with the requesting page server's ID and the hyperlink request ID.

The second page server sends the hyperlink request ID and application ID to the first page server to obtain the corresponding user ID and printer ID 10062. The first page server rejects the request if the hyperlink request has expired or is for a different application.

The second page server allocates document instance and page IDs 10050, returns the newly allocated page IDs to the application, adds the complete document to its own database, and finally sends the page descriptions to the requesting printer.

The hyperlink instance may include a meaningful transaction ID 10055, in which case the first page server includes the transaction ID in the message sent to the application. This allows the application to establish a transaction-specific context for the hyperlink activation.

If the hyperlink requires a user alias, i.e. its "alias required" attribute is set, then the first page server sends both the pen ID 10061 and the hyperlink's application ID 10064 to the registration server 10011 to obtain not just the user ID corresponding to the pen ID but also the alias ID 10065 corresponding to the application ID and the user ID. It includes the alias ID in the message sent to the application, allowing the application to establish a user-specific context for the hyperlink activation.

Competition Entry

Figure 3:
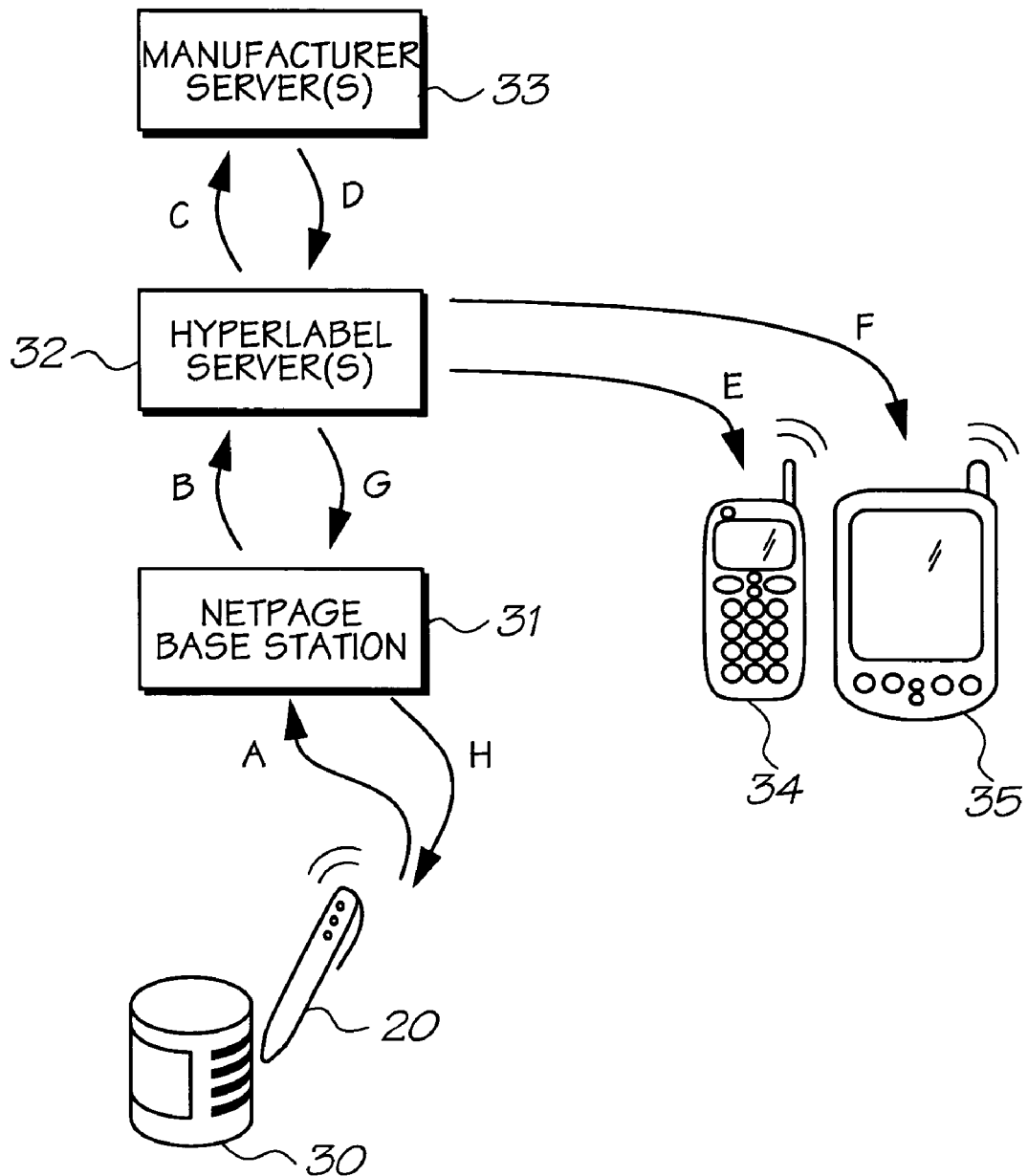
FIG. 3 is a schematic of competition entry interactions.

The invention utilises the hyperlabel/netpage technology as an efficient and effective vehicle for competition entry. The competition entry interactions are depicted in FIG. 3. An entry form is printed on a product item 30 which is read by a sensing device, such as pen 20. When a user (entrant) invokes a function on the entry form, the interaction data is sent to the netpage System, from the user's netpage pen 20, via wireless communication (A). The interaction data is transmitted from the pen to the user's netpage base station 31. The netpage base station 31 may be the user's mobile phone or PDA, or it may be some other netpage device, such as a PC. The interaction data is relayed (B) to the Hyperlabel™ server 32 and then on (C) to a competition administrator, which is normally a manufacturer server 33. The Hyperlabel™ server 32 knows the manufacturer server 33 to send the message to form the application ID. On receipt of the interaction data, the application identifies the desired response and sends the appropriate action/response message (D) to the Hyperlabel™ server 32. The Hyperlabel™ server 32, as part of the netpage system, can know the identity and devices of the user. The Hyperlabel™ server 32 will relay (E) the manufacturer server's response to the user's phone 34 or (F) Web browsing device 35, as appropriate. If the user's netpage pen 20 has LEDs then the Hyperlabel™ server 32 can send a command (H) to the user's pen to light the appropriate LED(s).

When a user commences interaction between their netpage pen and the competition entry form (product label) they become an entrant to the competition. The terms 'entrant' and 'user' are used interchangeably with the particular term used being dependent on the context for clarity. It is desirable that every user has their own pen so that their personal profile is recorded against the unique pen ID. However, a retailer could maintain a stock of pens that are assigned to users when they shop at the retailer. For instance, the user may register at a kiosk on arrival or at a retail outlet. The unique ID of the pen is associated with the user for the duration of shopping. The privacy of the user can be maintained in the manner described below. Alternatively, a user may be able to temporarily acquire a pen at the checkout for use during processing of their purchases.

Competition Entry User Interface

The Hyperlabel™ competition entry form may be printed on any surface such as a product brochure, product packaging or a form available at the place of purchase. A user may enter a competition using a single click of the pen, or by drawing, writing, or answering questions. The user may also click a button on the competition entry form to check the status of the competition.

Figure 4:
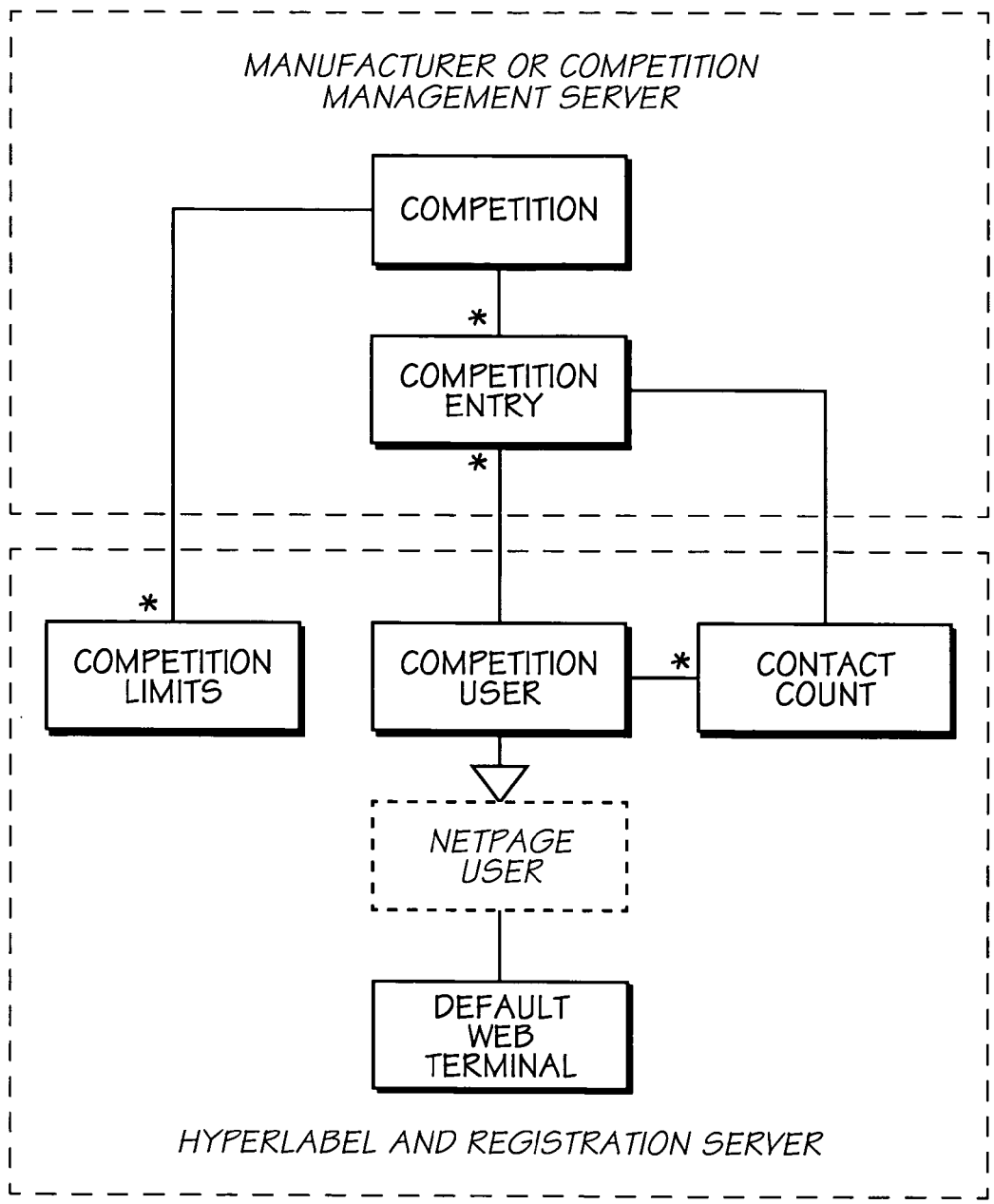
FIG. 4 shows the competition entry user interface flow.

The Competition Entry Form user interface flow is shown in FIG. 4. The primary user interface is the entry form shown in FIG. 5. There are three types of regions on the entry form: 'information fields' that show information about the competition; 'buttons' that generate actions; and 'entry fields' for user input.

The information fields include the competition name 50, description 51, and conditions 52. The buttons include <More Info> 53, <Submit Entry> 54, <Print> 55 and <Have I Won?> 56. The entry fields include text regions 57 where a user is invited to write a few words in answer to a question, check boxes 58 and a signature field 59.

The user presses the <More Info> button 53 to query more details about the competition. The Competition Details, shown in FIG. 6, are displayed on the user's default Web display terminal. The competition details includes the competition name, description, conditions, start date, end date, any other competition details, and details of the prizes being offered. The default WeB display terminal may be the user's mobile phone or PDA, or it may be a display provided by the retailer for the purpose.

The user enters text, and ticks check boxes to answer questions relating to competition entry. The user signs the form in the signature field to certify that they meet the minimum age requirements for competition entry. The user presses the <Submit Entry> button to submit the entry to the manufacturer via the netpage base station and hyperlabel server, as depicted in FIG. 3. The privacy of the user is protected by transmitting anonymous information to the manufacturer, as explained in more detail below. An Entry Confirmation Message is sent to the user, as shown in FIG. 7.

At any time after submitting an entry the user can press the <Have I Won?> button. The user is sent an Entry. Status Message, as shown in FIG. 8. The Entry Status Message gives the competition name, the date and time the entry was submitted and the prize details. The user presses the <Claim Prize> button to opt-in and reveal their identity to the manufacturer. If the user does not wish to reveal their information they can push the <No Thanks> button and opt-out.

In most cases the manufacturer will wish to collect demographic information before releasing a prize, however it is possible to issue a prize token irrespective of the information collected. In either case, a Claim Prize message is sent to the user, as shown in FIG. 9.

The user presses the <Print> button on the competition entry form to print the competition entry form on a netpage printer. This allows the user to complete an entry form on paper rather than using the packaging. In some cases, product packaging may be on a material that cannot easily be written on, for example, a foil or plastic chip packet. In this case it will also be necessary to print the entry form. The netpage printer may be a personal printer owned by a user who personally owns a netpage pen. Alternatively the retailer may provide a netpage printer at the point of sale. The entry form is then completed by the method described above.

Competition Entry Interaction Detail

As described above, a Hyperlabel™ competition entry form can contain printed text, various types of input fields such as check boxes, text input fields, drawing input fields or signature fields, and control buttons. The form may contain printed control buttons to submit the user's entry, or check the status of the user's entry.

A competition may be managed by the manufacturer, or the manufacturer may outsource the running of the competition to a third party competition management service.

Figure 10:
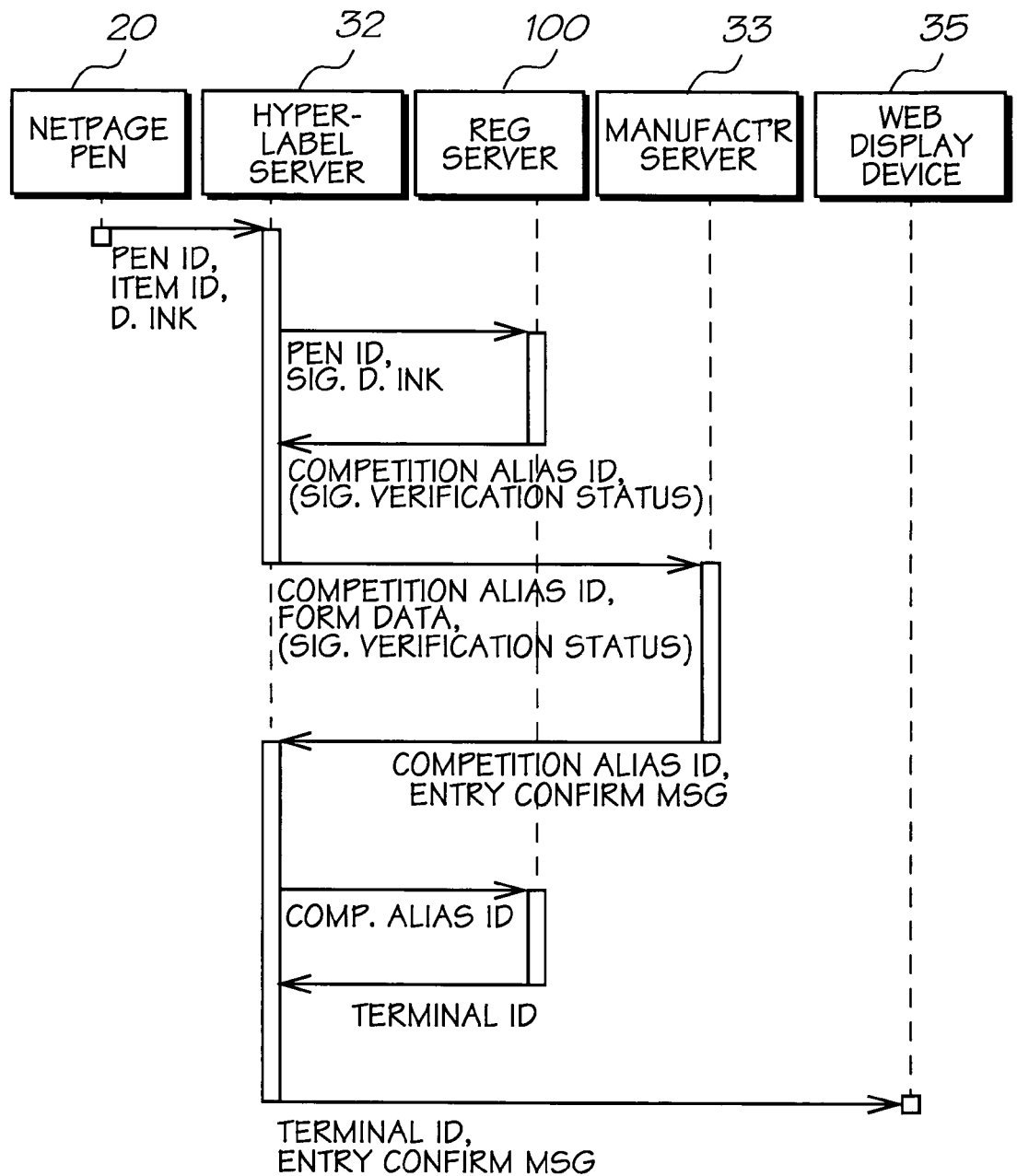
FIG. 10 shows the competition entry interaction detail.

The interaction detail for manufacturer Entry is shown in FIG. 10. The netpage user writes on an entry form and clicks a button to submit the entry. The netpage pen 20 sends the pen id, the product's item ID and the digital ink to the Hyperlabel™ server 32 via the netpage base station 31 (FIG. 3). The Hyperlabel™ server 32 sends the pen ID to the netpage Registration server 100, along with the digital ink from the signature field, if appropriate. The netpage Registration server 100 uses the pen ID to determine the netpage user id, and then allocates a competition alias ID and verifies the user signature. The competition alias id is a random number allocated by the netpage System in order to maintain the user's anonymity. The Hyperlabel™ server 32 converts the transmitted digital ink into form data, and sends the competition alias id, form data and signature verification status to the manufacturer server 33. The manufacturer server 33 validates the entry and, if valid, returns the competition alias ID and an entry confirmation message to the Hyperlabel™ server 32. The Hyperlabel™ server 32 sends the competition alias ID to the Registration server 100 which returns the default terminal ID for the user's default Web browsing device. The Hyperlabel™ server 32 then sends an entry confirmation message to the terminal id, which may be the user's preferred web display device, such as a PDA 35. Alternatively, the terminal is the device via which the input came.

Figure 11:
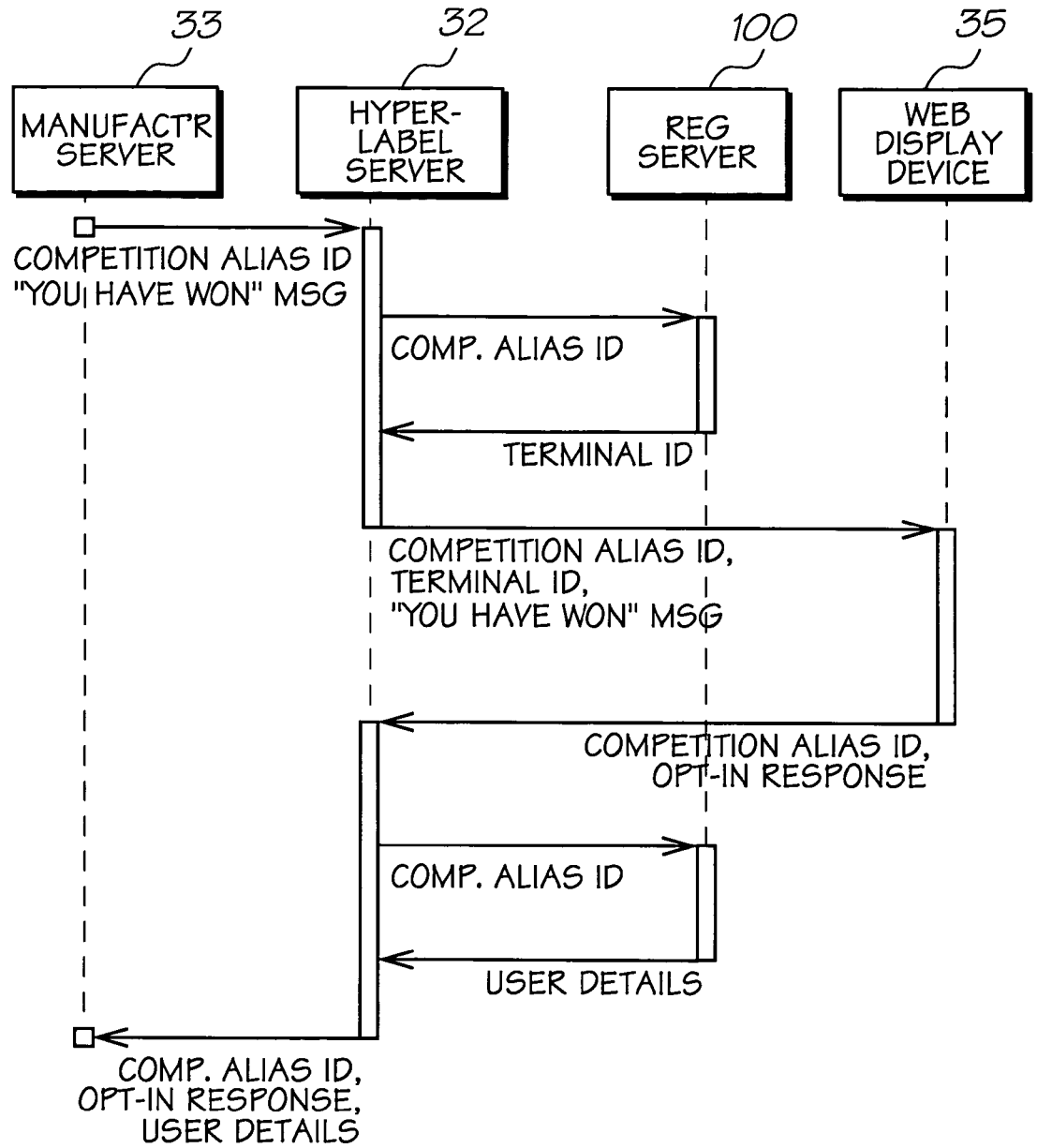
FIG. 11 shows competition win interaction detail.

The interaction detail for a Competition Win is shown in FIG. 11. When a competition winner is decided the manufacturer server 33 sends the winner's competition alias ID and the "You Have Won" message to the Hyperlabel™ server 32. The Hyperlabel™ server 32 sends the competition alias ID to the registration server 100 which translates this to the netpage user ID and returns the terminal ID of the user's default Web display device 35, such as PDA. The Hyperlabel™ server 32 then sends the competition alias id, terminal ID and "You Have Won" message to user's Web display device 35. The user then responds and the Web display device 35 sends the user's competition alias ID and their opt-in response to the Hyperlabel™ server 32. The Hyperlabel™ server 32 sends the competition alias id to the registration server which returns the user's details. The Hyperlabel™ server 32 then sends the competition alias ID, the opt-in response and the user's details to the manufacturer server.

Alternatively opt-in may be optional and the user may be able to collect their prize anonymously from a retailer or other prize collection point, as described in detail below.

Single-click competition entry is possible provided no other user-input information is required by the manufacturer. The user clicks on the <Submit Entry> button on the competition entry form and this results in a competition entry being sent to the manufacturer.

Alternatively, competition entry may require the user to write or draw something on the entry form, answer multiple choice questions, or tick check boxes. In this case, the user fills out the required fields using their netpage pen, and then clicks on the <Submit Entry> button.

Manufacturers do not need to publish all Hyperlabel™ items as instances to a netpage Server. Instead, the instance is published on demand, the first time the label is used. The product item ID is allocated as the unique transaction ID for the page instance. In the case of the user pressing the <Print> button, a new copy of the form is printed to the user's netpage printer. The page instance is given the same transaction ID (i.e. the product id), effectively superseding the original version, and preventing the original from being re-used.

Similarly, an entry form could contain a <Copy> button so that a copy of the entry form may be transferred to the user's Web browsing device allowing the user to fill in the entry form from the device and submit the entry to the manufacturer. In all these cases the entry form "replaces" the original. The original entry form, say from the product packaging, cannot be re-used to enter the competition multiple times.

User Contact and Feedback

The netpage System can limit feedback from the manufacturer to the user. A contact count may be kept which tracks the number of times the manufacturer has contacted the user. For example, a manufacturer may be permitted to send up to a limit of three messages to the user in relation to a competition. The manufacturer may send the user an "Entry Received" message, a "Competition Closing Soon" message, and then a "Competition Results" message. The netpage system can manage this type of contact and still maintain the user's anonymity through the use of a competition alias id.

The contact count will have a maximum value after which contact with the user is disabled. The maximum value for the contact count may be pre-set and notified to the user on the competition entry form. Alternatively, the maximum value may be a value that is able to be set by the user at the time of competition entry by interaction of the sensing device with a check box or data entry field on the competition entry form.

The user can get feedback in a variety of ways. The user's transaction may direct a Web page to be displayed on the user's PC, PDA or other Web browsing device. The output device is the device via which the pen input comes, or alternatively it is an output device registered to the user or to the pen. An email, SMS, page message, voicemail message or phone call may be sent to the user from the manufacturer via the Hyperlabel™ server (which can maintain the user's anonymity). Each time the manufacturer sends a message to the user the contact count is incremented for the user. This is used to limit the number of times a manufacturer can contact the user.

The user's netpage pen may have colored LEDs which can be used to provide feedback. For example, if the user presses a <Have I Won?> button, a query is sent to the manufacturer as to the status of the competition in relation to this user. The user's pen may show a green light if the user has won the competition, an orange light may indicate the competition is not yet decided, and a red light may indicate that the competition is closed and the user has not won.

This type of query and feedback mechanism may be handled by the netpage system, or alternatively the query may be passed to the manufacturer's server. If the status request message is sent to the manufacturer's server it has a "one-time-use" return path which allows the manufacturer to send a response to the user. Another model for feedback is the "blackboard model". This "blackboard" refers to a general location, such as a Web page, where the manufacturer can post information. The user can query this location to read the information while maintaining their anonymity.

Entry Validation

The Hyperlabel™ server 32, manufacturer server 33, or a competition management service can validate each competition entry. The unique product item ID enables the manufacturer to verify that the item was legitimately purchased, assuming that this information is sent from the retail system to manufacturer's system at the time of sale. It also allows the manufacturer to verify that there is a single competition entry per item.

Validation of any input fields can be performed if required. For example, the user may be required to write a description of why they would like to win the competition in twenty words or less. Validation can be performed to count the number of words written on the form, and reject the entry if necessary.

The competition conditions may limit the number of entries per user. It may not be possible for the manufacturer to perform this validation, depending on how the user's alias ID has been allocated, however a trusted identity management service, and/or the netpage system, can perform this validation on behalf of the manufacturer.

The competition entry form preferably has a signature field 59 (FIG. 5). This may have a variety of purposes, such as providing a declaration that the user meets entry age requirements. The user's signature will prove the identity of the user to the netpage system, so competition entry conditions, such as a minimum age requirement, can be verified by the netpage system prior to the entry being accepted and forwarded to the manufacturer. In the netpage System, a signature field has an associated digital signature value. Any digital ink captured in a signature field's zone is automatically verified with respect to the identity of the owner of the pen. No signature digital ink or digital signature value is passed to the manufacturer, but the netpage system will verify the signature and set a flag indicating the verification status of the digital signature.

If an entry fails to meet the entry requirements it can be rejected and, optionally, a message can be sent to the user via one of the feedback mechanisms described above.

User Anonymity

As mentioned above, the anonymity of the user can be maintained throughout a competition. When the competition entry is sent to a competition administrator such as a supplier or product manufacturer, the user's identity is protected by the netpage system. The user may remain anonymous to the product manufacturer until such time as they choose to authorize the manufacturer to access their identity and contact details.

Alternatively, the manufacturer may choose to use a trusted third-party identity escrow service to manage the user's anonymity. The third-party would be trusted by the netpage system to manage the user's identity and maintain the user's anonymity until such time as the user authorizes the third party to reveal the user's identity.

When a user requests a netpage in a particular application context, the application is able to embed a user-specific transaction ID in the page. Subsequent input through the page is tagged with the transaction ID, and the application is thereby able to establish an appropriate context for the user's input.

When input occurs through a page which is not user-specific, however, the application must use the user's unique identity to establish a context. To protect the user's privacy, however, the unique user ID known to the netpage system is not divulged to applications. This is to prevent different application providers from easily correlating independently accumulated behavioral data.

The netpage registration server instead maintains an anonymous relationship between a user and an application via a unique alias ID. Whenever the user activates a hyperlink tagged with the "registered" attribute, the netpage page server asks the netpage registration server to translate the associated application ID, together with the pen ID, into an alias ID. The alias ID is then submitted to the hyperlink's application.

The application maintains state information indexed by alias ID, and is able to retrieve user-specific state information without knowledge of the global identity of the user.

The system also maintains an independent certificate and private signature key for each of a user's applications, to allow it to sign application transactions on behalf of the user using only application-specific information.

A user's competition alias ID may be unique to a netpage user and competition ID combination. In other words a netpage user would have a unique competition alias ID for each competition they entered. If a manufacturer were running more than one competition then the user would have more than one competition alias id. The manufacturer would not be aware of the connection between the competition alias IDs unless the user opted in and revealed their identity for each competition.

An alternative approach is that the competition alias ID is unique to a netpage user and manufacturer combination. If a manufacturer runs several competitions then a single competition alias ID will be used for all the user's entries to these competitions. The manufacturer can determine if a single netpage user has entered multiple competitions. If the user opts in and reveals their identity in one competition, the manufacturer can correlate the user's identity with a competition alias ID across the multiple competitions. The competition alias ID may persist even after a competition closes.

Another possibility is that a user's competition alias ID is unique to a netpage user and competition entry combination. In this case the manufacturer could not tell if a single netpage user had entered the same competition more than once.

The object model in this document uses the competition alias ID as unique to a netpage user/manufacturer ID combination, but other methods for allocating a competition alias ID are possible.

Another approach to maintaining anonymity of an entrant to a competition (user) is to provide a temporary telecommunication address as an alias to the actual telecommunication address recorded for the user of the sensing device. As shown in FIG. 3 and described above, interaction of the netpage pen 20 with a product item 30 results in interaction data to the user's netpage base station 31 and on to Hyperlabel™ server 32. The Hyperlabel™ server 32 maintains a database of registered users of netpage pens and can access details of the user, such as the telecommunication address of the user's preferred telecommunication device, be it a PDA, mobile phone, or other similar device. The hyperlabel server can generate a temporary telecommunication address to substitute for the actual telecommunication address, thus maintaining the anonymity of the telecommunication address of the user from the manufacturer server 33.

When the manufacturer server 33 sends a message to the temporary telecommunication address, the hyperlabel server forwards the message to the telecommunication address of the user.

A temporary telecommunication address can be associated with a telecommunication address of a competition entrant by any appropriate associating means. The task may be performed by the Hyperlabel™ server 32 as described, by the netpage base station 31, by the registration server 100, or by an additional server in the system programmed for the task, such as an escrow server associated with the manufacturer server.

One approach to generating the temporary telecommunication address is to use encryption algorithms to generate an encrypted telecommunication address for an entrant. The encrypted telecommunication address is used for communication to and from the manufacturer server. It is decrypted before any communication is forwarded to the entrant.

The server that generates the temporary telecommunication address may also maintain a counter to monitor the number of times communication is forwarded to the telecommunication address of the entrant. A limit can be placed on the number of times information is forwarded.

Prize Collection at Retailer

If a competition user is eligible for a prize they may be able to collect the prize directly from a retailer or other prize collection point. The user may be able to collect their prize but remain anonymous. The user only needs to provide something that can identify them as being a specific competition user. If the user has collected a pen from a retailer for the duration of their shopping trip the need for identification will be automatically satisfied.

When the user is notified that they have won a prize they may collect the item they have won from the store shelf and take it to the service desk. Alternatively the service desk may hold the prizes in reserve.

Figure 12:
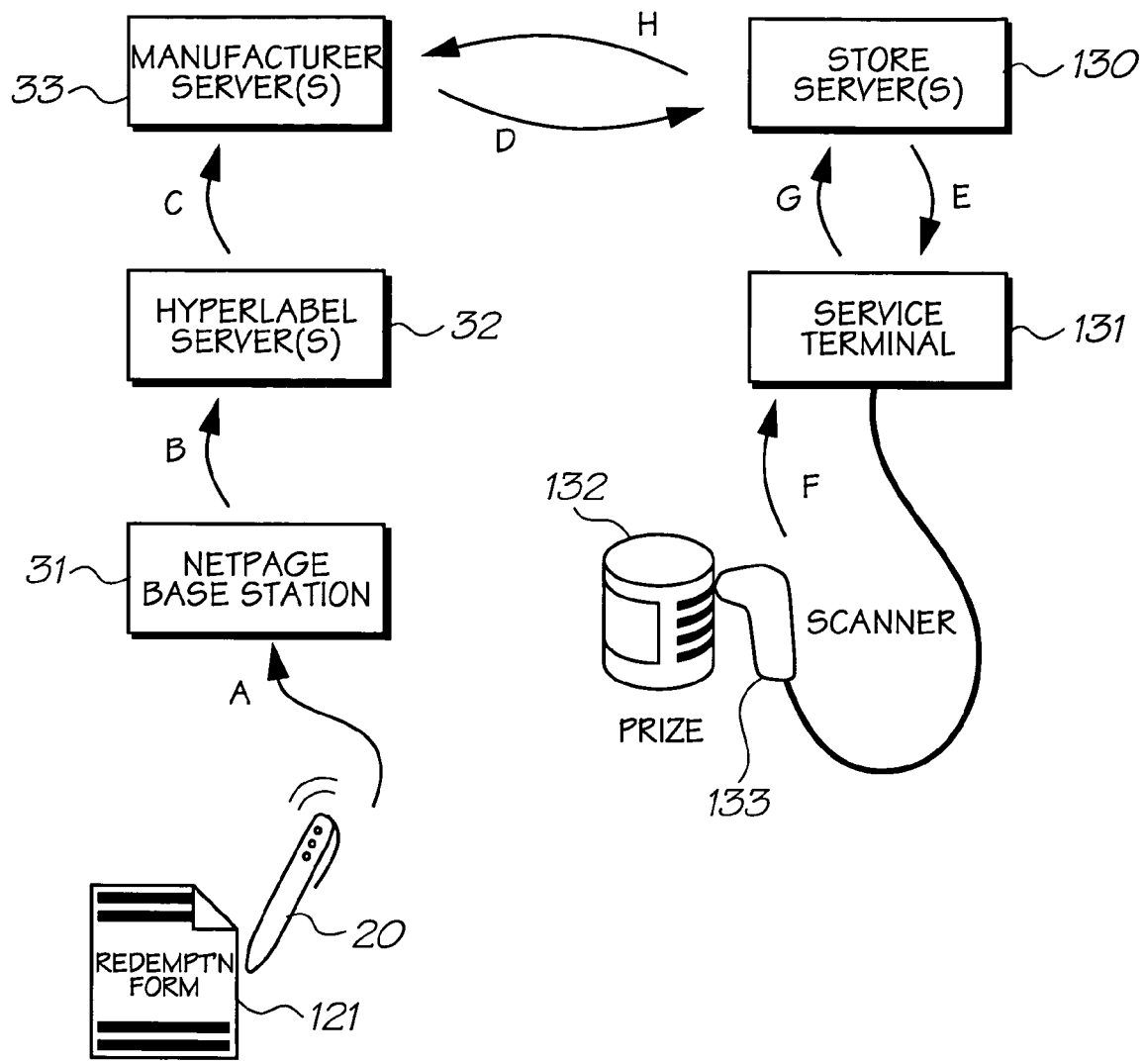
FIG. 12 is a schematic of prize redemption at a retailer.
Figure 13:
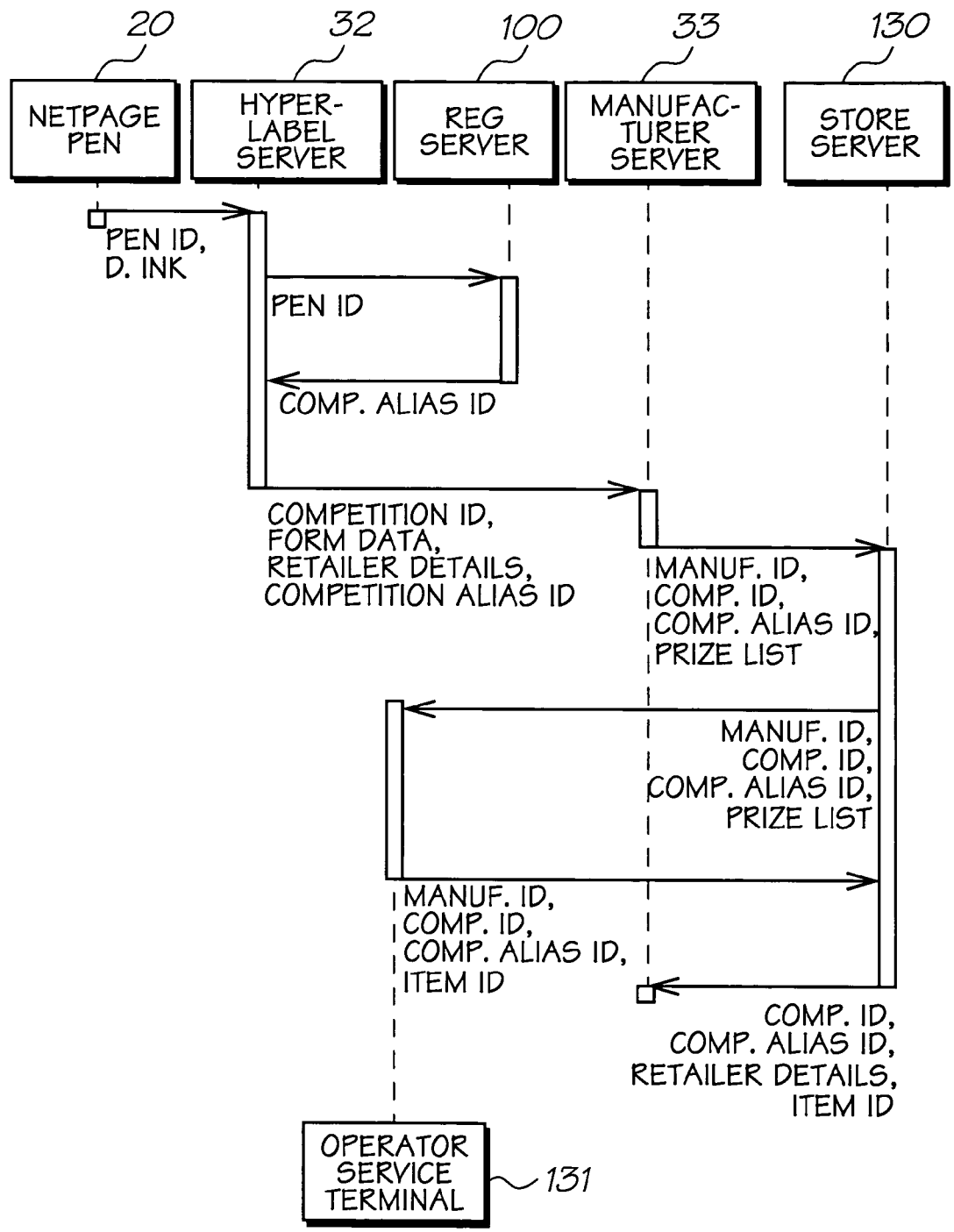
FIG. 13 shows interaction detail for coupon-less prize collection.

The service operator may have a Hyperlabel™ prize form from the manufacturer, listing the prizes available in the competition. The redemption form may be printed by the operator on demand. The form identifies the retailer and potentially the operator's terminal. The Prize Collection at Retailer interaction diagram is shown in FIG. 12 and the interaction detail is shown in FIG. 13.

The user clicks their pen 20 on the prize redemption form 121 provided by the service operator in order to identify themselves (A) to the netpage base station 31 as a particular competition user. Alternatively, the user's pen may be a Hyperlabel™, allowing the operator to scan the user's pen at the terminal, in order to verify the user's identity. Other forms of identification that may be provided by the user are possible, and include a rewards card, a prize token, a mobile phone or PDA etc.

The digital ink and the user's pen ID are sent (B) from the netpage pen 20 via a netpage base station 31 to the Hyperlabel™ server 32. The Hyperlabel™ server 32 translates the digital ink, and sends the pen id to the registration server 100, which returns the pen user's competition alias ID. The competition ID, retailer details (identifying the store, operator and service terminal), and competition alias ID are sent (C) to the manufacturer's server 33 which looks up the prize(s) won by this user.

The manufacturer's server 33 may send (D) the prize details to the store server 130 for notification (E) to the operator's service terminal 131. The operator can then scan (F) the items 132 being redeemed with a fixed local scanner 133. Details of the scanned item go (G) to the store server 130, and the store server 130 sends a message back (H) to the manufacturer's server 33 indicating the item ID of the prizes 132 collected by the competition user.

Alternatively, the manufacturer server 33 may send a yes or no answer to the store server 130, indicating whether the user is eligible for any prizes, along with a redemption ID for the competition user. The redemption ID is a temporary transaction ID. The store server 130 then sends a message to the operator's service terminal 131 putting the terminal into a prize redemption mode. The operator may then scan the item(s) being claimed by the user. The redemption ID and item ID are sent back to the manufacturer's server 33 to validate whether this item can be claimed by the competition user.

Rather than a user being eligible for a prize of a single specific product, there may be a prize list from which the user can choose. The prizes may vary and be specific to a store or retail chain.

This allows more flexibility for competitions and rewards schemes.

Instant Win

Figure 14:
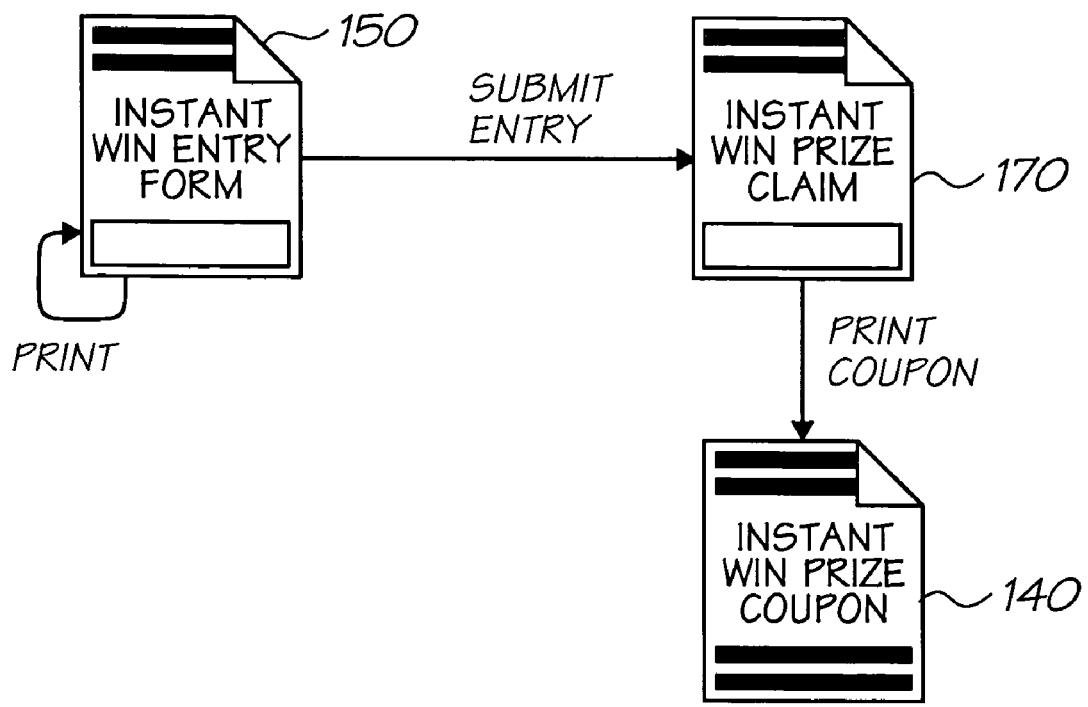
FIG. 14 is a schematic of an instant win competition user interface.

A variation on competition entry often used by manufacturers is the concept of "instant win". An Instant Win Competition user interface flow is shown in FIG. 14. The user answers the questions on the Instant Win Entry Form 150, as shown in FIG. 15, and presses the <Submit Entry> button 151. The Instant Win Prize Claim message 170 is sent to the user, as shown in FIG. 16. The user presses the <Print Coupon> button 171 to print the prize claim coupon on a netpage printer.

As with the competition entry described above, the user may press the <Print> button 152 on the instant win entry form to print the entry form on a netpage printer. This allows the user to complete an entry form on paper rather than using the packaging.

The competition entry form, in this case, may or may not include questions that the user must answer. The user clicks on the <Submit Entry> button 151 and the entry is sent to a competition administrator such as the manufacturer server. If the entry meets the competition's entry requirements the user is automatically eligible to claim the manufacturer's offer. The product item id, obtained from the package Hyperlabel™, allows the manufacturer to verify that the product was legitimately purchased before allowing the user to claim a prize. It also allows the manufacturer to verify that there is a single competition entry per item.

Figure 17:
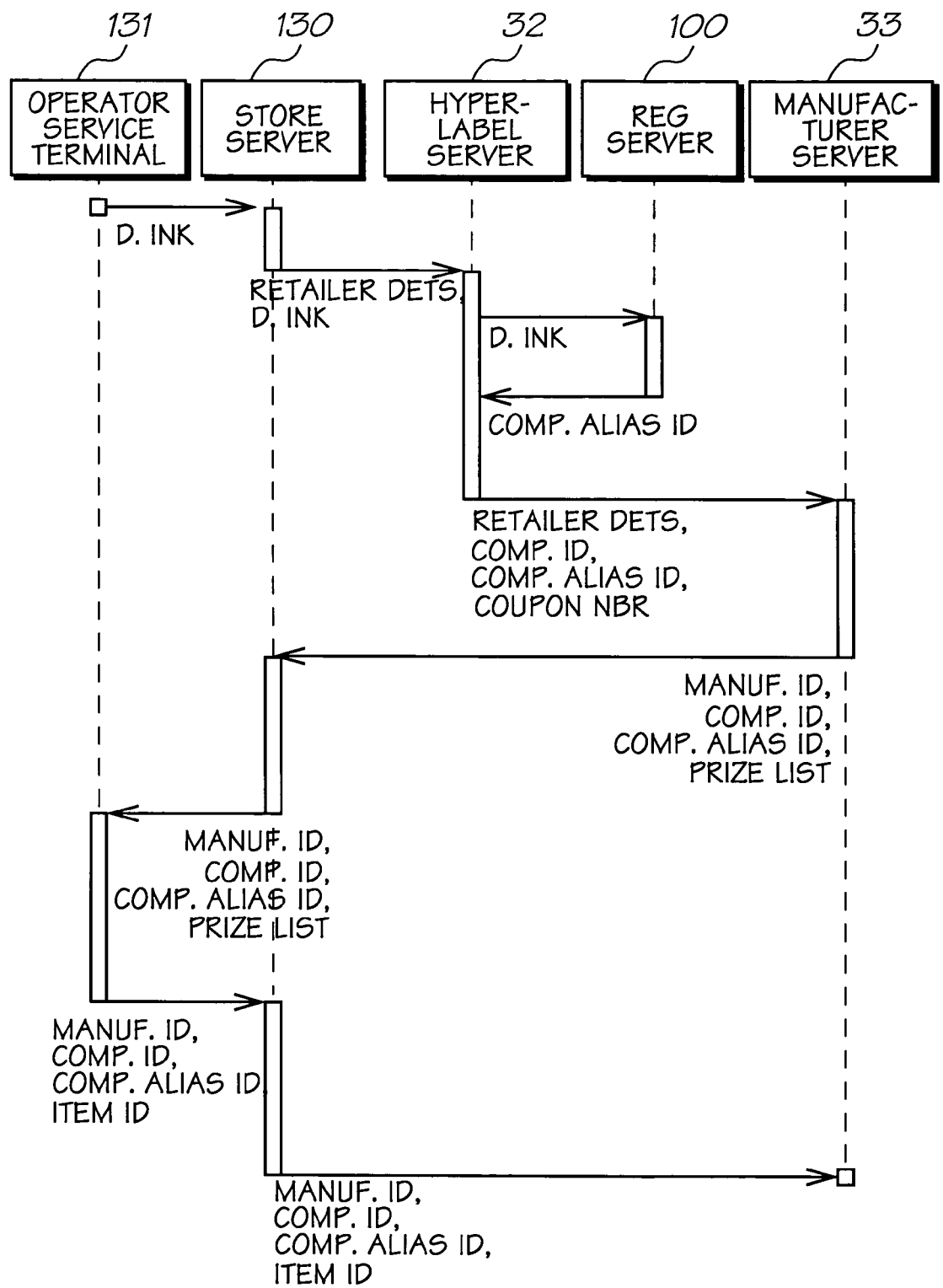
FIG. 17 shows interaction detail for anonymous prize collection using a coupon.

The manufacturer may send a message to the user's Web display device, or through some other feedback, instructing them how to claim the prize. The user may remain anonymous and collect their prize from the retailer as described above. Alternatively, the user may be required to reveal their identity in order that the prize can be delivered. Another alternative is that an instant win coupon 140 (FIG. 14) is printed, which can be redeemed for a prize. The coupon is printed with a serial number, and may be a netpage coupon i.e., invisibly tagged. The interaction detail for prize collection using a coupon is shown in FIG. 17.

A prize may be redeemed by the user taking the coupon to the operator service terminal 131 where the coupon is scanned and digital ink is sent to the store server 130. The store server 130 sends the digital ink and retailer details to the Hyperlabel™ server 32 that sends the digital ink to the registration server 100 which returns a competition alias ID. The Hyperlabel™ server 32 sends the retailer details, competition ID, competition alias ID and coupon number to the manufacturer server 33 for verification and authentication. The manufacturer server sends a manufacturer ID, competition ID, competition alias ID and prize list back to the store server 130 which passes the data to the operator service terminal 131. The user chooses a prize from the prize list and the operator service terminal 131 reports this to the store server with the manufacturer ID, competition ID and competition alias ID, which are passed to the manufacturer server 33 as confirmation.

It will be appreciated that the user may remain anonymous throughout the instant win coupon prize collection process.

Token Collection

Another form of purchase incentive often employed by product manufacturers is that of token or coupon collection. This refers to some mechanism whereby a consumer provides proof of purchase for one or more products and a coupon administrator, such as a manufacturer, in return provides some form of reward.

This type of scheme can easily be implemented with Hyperlabel™ packaging. The packaging can be printed with details of the offer and a <Token> button. The user clicks on the <Token> button on the required number of products, and is then eligible for the manufacturer's offers.

The product Hyperlabel™ provides the product's unique item id. This allows the manufacturer or third-party competition manager to validate that each <Token> button is from a separate product, and not multiple <Token> presses on the same item. The product item ID also enables the manufacturer to verify that the item was legitimately purchased, thereby preventing a user from claiming an offer by clicking on <Token> buttons in-store. Further, the product item ID allows the manufacturer to validate that each token is used by a single user.

Once the conditions of the offer have been met, the user may be required to explicitly provide their contact details to the manufacturer. A message may be sent from the manufacturer or competition manager to the user requesting this information. Alternatively the user may be contacted and asked to merely press a button, or perhaps provide their signature, which authorizes the netpage system to send the user contact information to the manufacturer. This type of communication with the user occurs in the usual way e.g. via the user's Web terminal, mobile phone etc.

Alternatively, once the conditions of the offer have been met, the user may print a coupon which can be presented to a retailer for prize redemption (as described above). Another alternative is the user may collect their prize direct from a retailer or other prize collection point as described earlier. This type of collection may allow the user to collect their prize anonymously.

Rewards Scheme

In a variation on the competition mechanism already described, a rewards scheme can be implemented in a similar way to the token collection scenario. A user may have a rewards scheme card which allows the user to accumulate points towards prizes or rewards. The card may be a Hyperlabel™ to allow a store operator to scan it.

Each card has a unique identifier. A rewards scheme may be offered by a manufacturer, or by a particular store, retail chain, or service provider.

A Hyperlabel™ rewards card need not be identified as belonging to a particular netpage user, but can be associated with a competition user. The card may have a button which, when clicked, allows the user to query how many points they have accumulated, displaying the result on their default Web terminal.

Points may be accumulated in a variety of ways. The rewards card may be scanned by a store operator at the time of product purchase. Alternatively the netpage user may claim points by clicking on the relevant items they have purchased. More points may be offered by the scheme owner based on the level of participation by the user, for example, if the user opts in to allowing email notifications of special offers or new products they may receive bonus points.

Dynamic User Registration

The netpage system allows for dynamic user registration if a user and/or sensing device are not already registered with the computer system. Most of the scenarios mentioned above rely on the netpage registration server (or equivalent server) identifying the user's netpage user id and the associated web display terminal id from the pen id. If the user or pen is not already registered with the netpage system, the user may be dynamically registered with the netpage system when they first interact with a competition entry form.

When the netpage Registration server receives an unknown pen id it allocates a temporary netpage user id. The default return messaging channel is set to point to the device that relayed the pen's message, such as a mobile phone, PDA or PC. The return messaging channel may be identified by a phone number, pager number, PDA network address (e.g. IP address, MAC address etc.), email address, network subscriber identifier etc. The relaying device either explicitly includes the return channel address in the message relayed to the Hyperlabel™ server (and hence to the Registration server), or the Hyperlabel™ server determines the address in a protocol-specific way. For example, the Hyperlabel™ server may extract the IP address of the relaying device from the message if delivered via an IP network, or may use Caller Identification or some other telephone network mechanism to determine the phone number of the relaying device. In the case of an IP address the Hyperlabel™ server may assume a standard port number for the return messaging channel.

Dynamic registration is only really useful if a return messaging channel can be identified. The temporary netpage user id may be maintained forever or only for the duration of the competition.

Competition Entry Object Model

Figure 18:
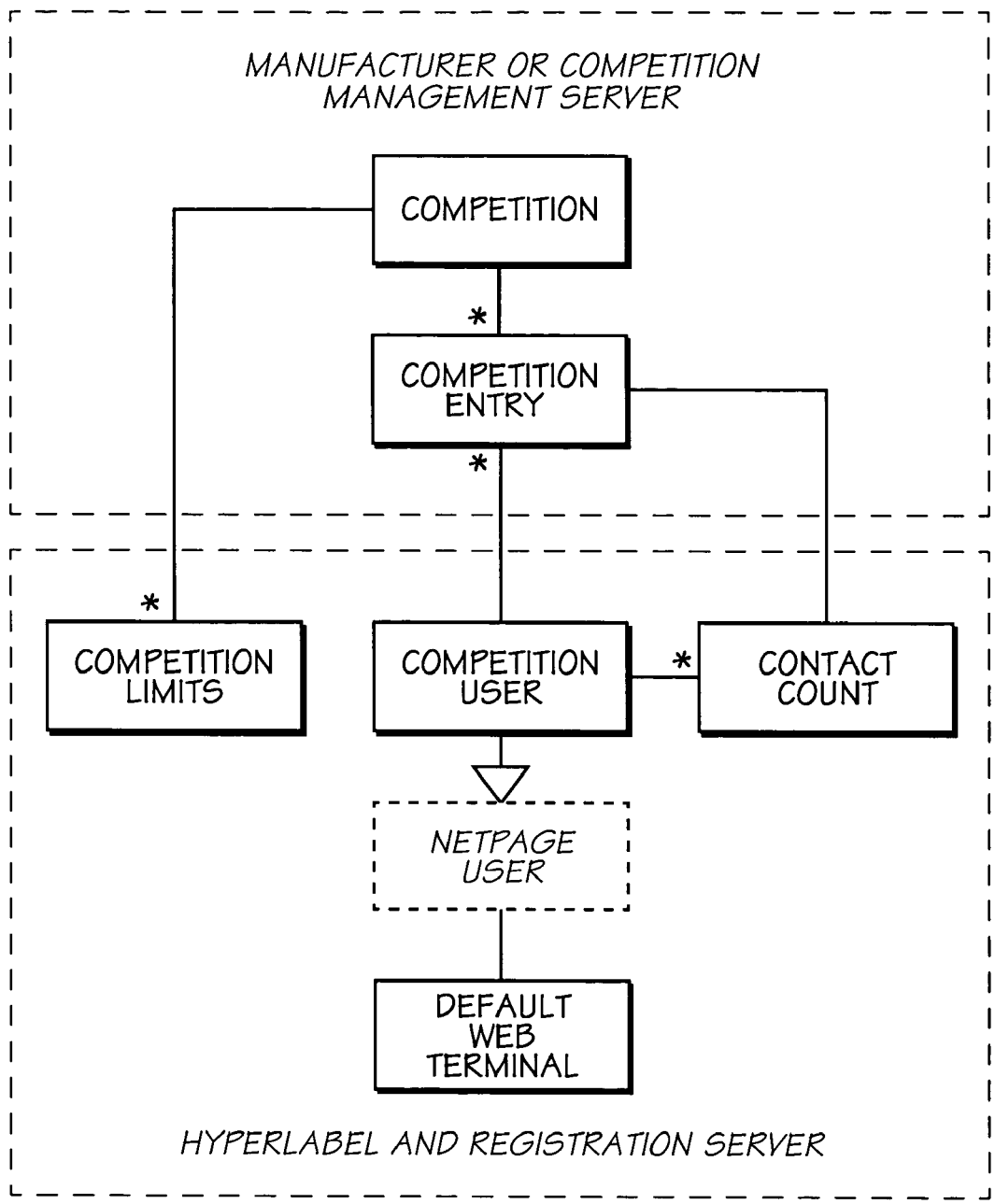
FIG. 18 shows a schematic of competition object management.

The Competition Entry object model revolves around competitions, competition entries, and competition users. FIG. 18 illustrates the management and organisation of these objects. The Manufacturer or Competition Management Server 180 manages the competition and competition prizes. The Hyperlabel™/netpage System 181 manages the competition entry (hyperlabel server 33) and user interface (registration server 100)

Figure 19:
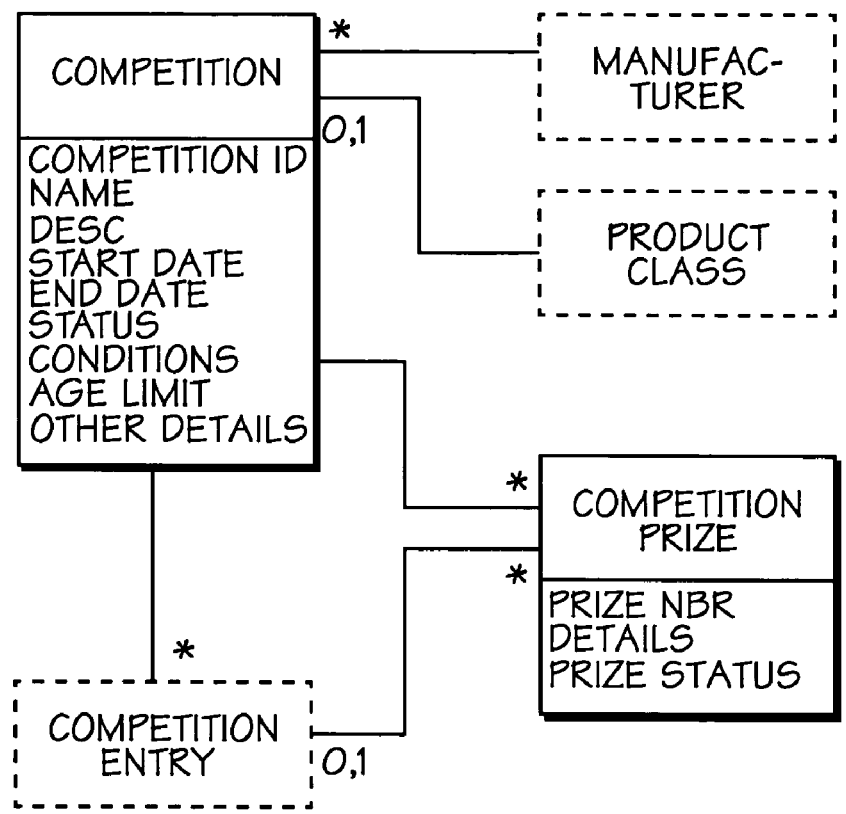
FIG. 19 shows a competition class diagram.

A competition class diagram is shown in FIG. 19. A manufacturer may have many competitions. Each competition is associated with a product class and a manufacturer. A competition has a unique competition id, a name, description, a start date and end date, status, conditions, age limit, and other details. The status indicates whether a competition is open, i.e. no winner had yet been drawn, or closed i.e. the winner(s) have been decided and no more entries are being accepted. The age limit indicates the minimum age requirements (if any) for any user submitting an entry.

Figure 20:
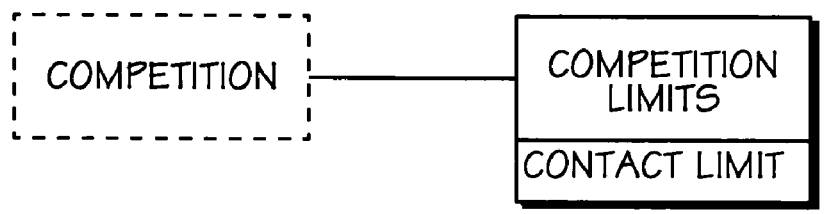
FIG. 20 shows a competition limits class diagram.

Associated with each competition, and managed by the Hyperlabel™/netpage system, is a competition limits object comprising a contact limit. The contact limit indicates the maximum number of times a competition user may be contacted by the manufacturer in relation to this competition. The Competition Limits class diagram is shown in FIG. 20.

A competition has one or more prizes. Each competition prize has a prize number which is unique within a competition, details (giving a description of the prize), and a prize status. The prize status indicates if the prize has been redeemed, drawn but not yet redeemed, or not yet drawn. When a winner is drawn for a competition, the competition user is associated with the relevant prize and the prize status is updated.

Figure 21:
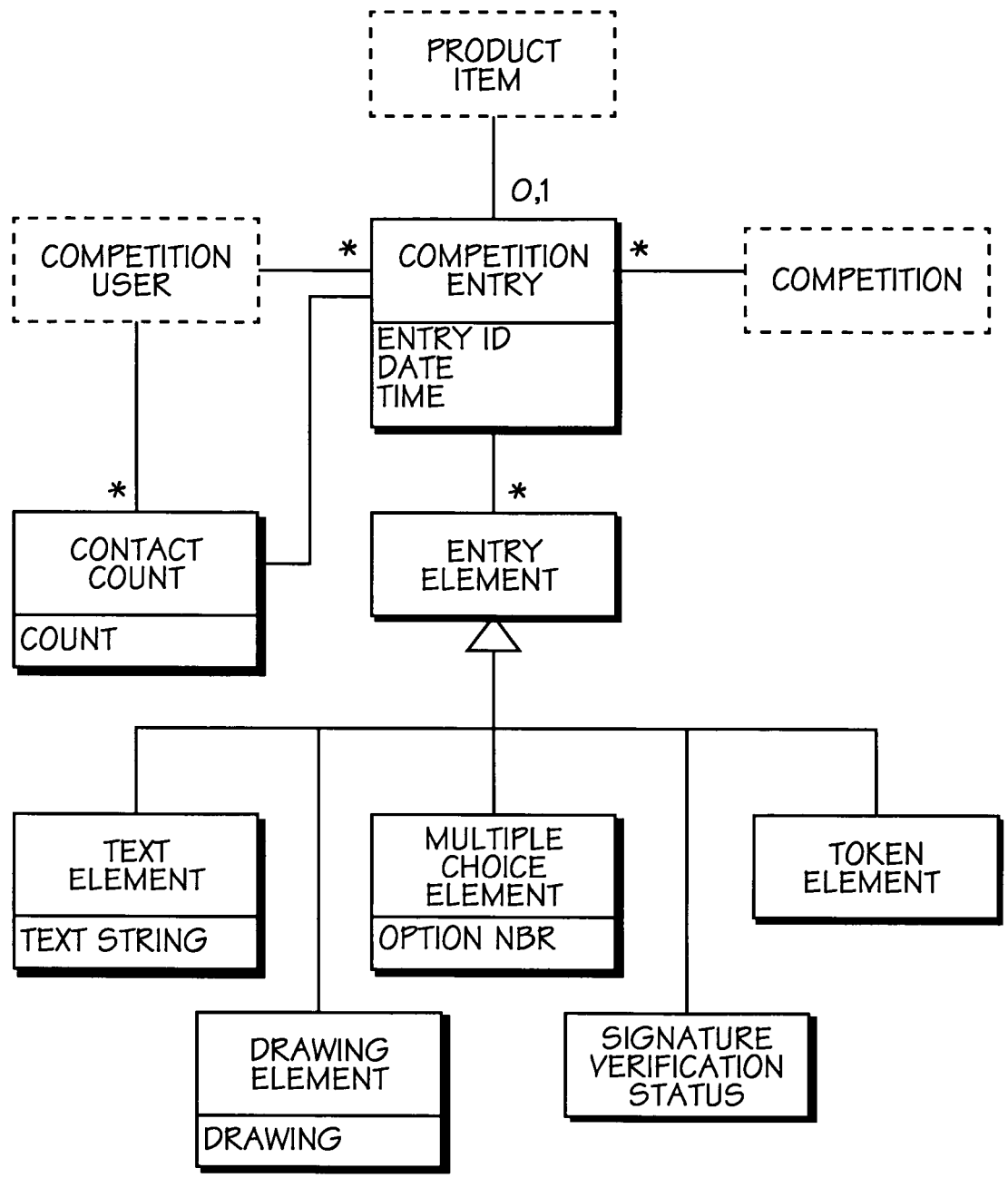
FIG. 21 shows a competition entry class diagram.

Each competition will have a large number of competition entries. The Competition Entry class diagram is shown in FIG. 21. Each competition entry is associated with a product item. Each competition entry has an entry id, unique within the competition, and the date and time the entry was received. A competition entry can have a number of entry elements, depending on the input fields on the entry form. The entry may have a text element, for user entered text, a drawing element for a user-entered drawing, a multiple-choice option number (if the entry contained a multiple-choice question), and a signature verification status. The competition entry may have a token element if the competition entry conditions involve collecting tokens.

Figure 22:
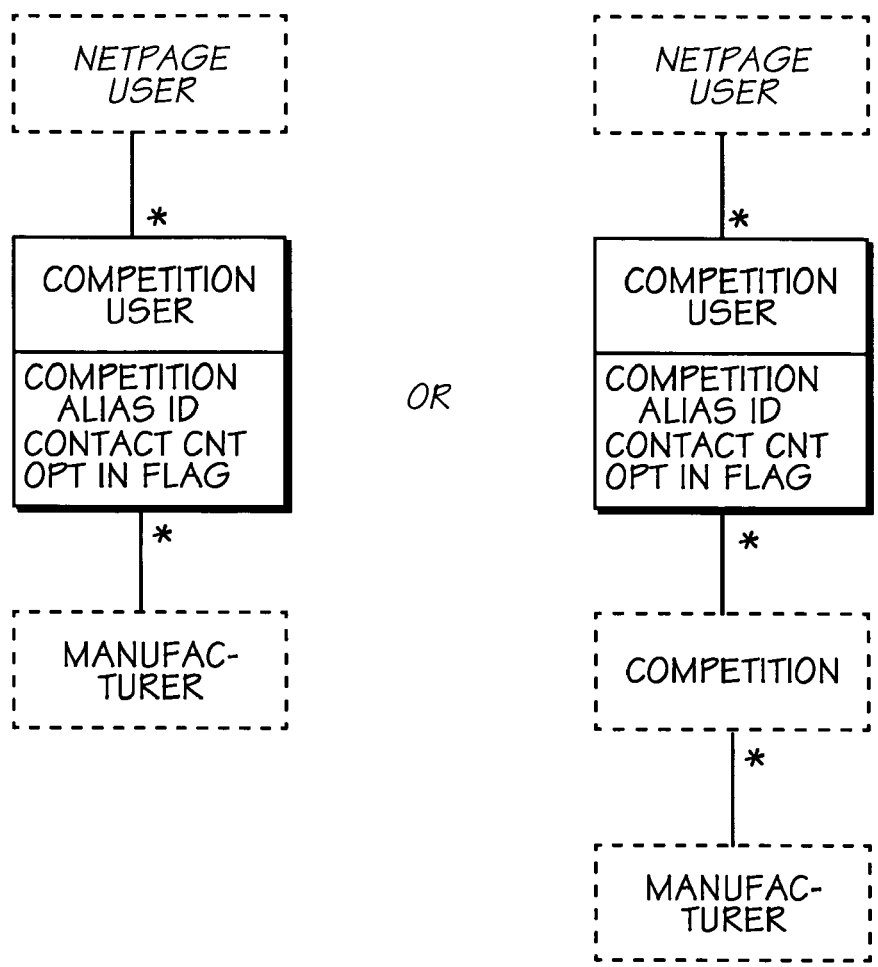
FIG. 22 shows a competition user class diagram.

A netpage user can enter many competitions. The Competition User class diagram is shown in FIG. 22. A netpage user is allocated a competition alias id. The netpage user may be allocated a unique competition alias ID for each manufacturer, and this alias ID will be used for all competitions associated with this manufacturer. Another alternative is that the netpage user may be allocated a unique competition alias ID for each competition they enter. Regardless of how the competition alias ID is allocated, the competition user object comprises the competition alias id, a contact count indicating how many times the manufacturer has contacted the user, and an opt in flag. The opt in flag is set to true if the user has agreed to reveal their identity and contact details to the manufacturer for the purposes of claiming an offer.

Figure 23:
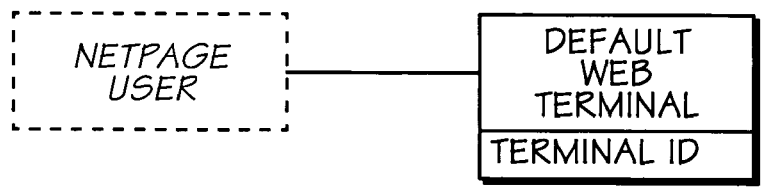
FIG. 23 shows a default web terminal class diagram.

A netpage user has a default Web terminal, with an associated terminal id. This is the default Web display device for the user. The Default Web Terminal class diagram is shown in FIG. 23.

As described in the section on Dynamic User Registration, the netpage registration server may allocate a temporary user id the first time a user enters a competition using a sensing device that has not previously been registered. Part of the temporary user id is recordal of a return messaging channel, which may be a phone number, pager number, PDA network address, email address, subscriber id, or similar communication channel. A class diagram for the temporary user is shown in FIG. 32.

Although specific reference is made to a netpage pen, any netpage sensing device can be used. Specific reference is made to a Hyperlabel™ server, which is a specific instance of a netpage page server, and to a registration server. The registration server and the Hyperlabel server can be the same server.

It will be appreciated by those skilled in the relevant fields that a number of other embodiments, differing from those specifically described, will fall within the scope of the present invention. Accordingly, the invention is not intended to be limited to the specific embodiments described in the specification, including documents incorporated by cross-reference as appropriate.

Loyalty Schemes

It will be appreciated that the tokens can be related to participation in a loyalty or reward scheme, in which points are allocated to purchases made by a user. Upon accumulating sufficient points, users can exchange the points for goods or services, or for upgrades or discounts on goods and services they wish to pay for.

An example of such a scheme is any of the bonus programs run by various groups of airlines, in which discounts, upgrades and free flights can be earned by accumulating points based on distances flown using affiliated airlines. Points can also be accumulated by purchasing goods and services at certain outlets, and using certain credit facilities such as particular brands of credit card.

In the present context, points can be collected and allowed to accumulate over time by interacting with tokens on product labels of products. Each token can be worth a fixed number of points, although special bonus offers for interacting with multiple tokens of a particular type, or a particular combination of tokens from different products or product types. Promotions can be run whereby the points associated with a particular token or tokens can temporarily be increased in a store or chain of stores.

If the user is registered with a particular program, a catalogue can be accessed online (or sent periodically) informing the user of what they can purchase for various predetermined numbers of accumulated points. If the catalogue is provided in printed form, it is particularly desirable that it be netpage enabled, which allows the registered user to select (via a checkbox, circling gesture, or in any other suitable fashion) which goods or services they wish to purchase. The system can be set up such that ordering and delivery of the chosen goods or services requires no filling in of forms, or phone calls.

Similarly, if the catalogue is provided by an electronic delivery mechanism such as email, it is preferred that it include data such that printing it on a netpage-enabled printer results in a netpage-enabled document that can be interacted with as described above.

The user can also be spent special offers that are likely to be of interest given such information as past purchases (both via the catalogue and as part of obtaining the tokens/points in the first place) and the number of points they have accumulated.

The invention claimed is:

1. A method of providing anonymous entry to a competition via a printed competition entry form that includes machine-readable coded data, the coded data including a plurality of tags each encoding data on an identity of the printed form and the location of that tag on the printed form, the method including the steps, performed in a computer system, of:
receiving, at the computer system, interaction data representing interaction of a pen sensing device with the tags of the coded data;
identifying, at the computer system, a digital description associated with the printed form from the form identity represented in the received interaction data and capturing a competition entry by determining locations in the digital description associated with the locations of the interacted tags represented in the received interaction data;
assigning, at the computer system, a competition alias identifier (ID) to the captured competition entry; and
transmitting, from the computer system, the competition entry to a competition administrator with the competition alias ID, thereby enabling the anonymous entry to the competition.

2. The method of claim 1, wherein the form is disposed on a product label including human-readable information relating to the competition, and the coded data is indicative of at least an identity of the label, wherein the interaction data includes at least the identity of the label.

3. The method of claim 2, wherein at least some of the coded data includes a label identifier.

4. The method of claim 3, wherein the label identifier is a unique product item identifier.

5. The method of claim 4, wherein the unique product item identifier is an electronic product code.

6. The method of claim 5, wherein the coded data is substantially invisible to a human.

7. The method of claim 1, wherein the interaction data includes digital ink, the digital ink having been generated by the pen sensing device in response to movement of the pen sensing device relative to the entry form, the method including the step of transmitting the digital ink to the competition administrator.

8. The method of claim 1, wherein the interaction data includes a device identifier (ID) associated with the pen sensing device used to generate the interaction data, and the step of assigning the competition alias ID is performed in reliance on at least the device ID.

9. The method of claim 8, wherein the competition alias ID is selected or calculated so as to be unique to a combination of the device ID and a competition identity.

10. The method of claim 1, wherein the competition alias ID is selected or calculated so as to be unique to a combination of the device ID and a manufacturer, producer or other entity associated with the product.

11. The method of claim 1, wherein the competition alias ID is selected or calculated so as to be unique to a combination of the device ID and a competition entry.

12. The method according to claim 1, for providing entry to a competition via machine-readable coded data on an entry form on a printed label of a product, the method including the steps of:

receiving, in a computer system, interaction data from the pen sensing device, the interaction data representing interaction of the pen sensing device with the coded data on the entry form, the competition entry being electronically captured in the computer system by using the interaction data; and transmitting the competition entry to a competition administrator.

13. The method according to claim 1, using a product label for providing entry to a competition, the product label comprising:

machine-readable coded data indicative of at least an identity of the label, said machine-readable coded data being readable by the pen sensing device as the pen sensing device is moved across the product label, thereby to produce interaction data for competition entry;

human-readable information pertaining to the competition, the human-readable information being at least partially coincident with the machine-readable coded data, the human-readable information including at least one field element that has a corresponding zone defined in relation to it in a page description stored in a remote computer system.

14. The method according to claim 1, for providing anonymous entry to a competition, the competition being entered by interaction of the pen sensing device with a product label to generate interaction data indicative of at least an intention to enter the competition, the method including the steps, performed in a computer system, of:

identifying a first telecommunication address of the entrant from either an identity of the pen sensing device received or determined in the computer system or the interaction data;

associating a temporary telecommunication address with the first telecommunication address;

sending the temporary telecommunication address and interaction data to a competition administrator;

receiving, from the competition administrator, information from the competition administrator addressed to said temporary telecommunication address; and forwarding the information from the competition administrator to the first telecommunication address.

15. The method according to claim 1, for competition entry by an entrant and limitation of subsequent communication between a competition administrator and the entrant via the pen sensing device interacting with machine-readable coded data on a printed competition entry form, the method comprising the steps, performed in a computer system, of:

(a) receiving interaction data representing the interaction of the pen sensing device with the coded data, the competition entry being electronically captured in the computer system by using the interaction data;

(b) transmitting the competition entry to the competition administrator; and (c) configuring the computer system to transmit up to a predetermined number of electronic messages from the competition administrator to the entrant.

16. The method according to claim 1, for limiting communication between an application and a user, via the pen sensing device interacting with machine-readable coded data printed on a surface, the method comprising the steps, performed in a computer system, of:

(a) receiving interaction data representing the interaction of the pen sensing device with the coded data, the interaction data enabling identification of the application;

(b) transmitting information based on at least some of the interaction data to the application; and (c) configuring the computer system to transmit up to a predetermined number of electronic messages from the application to the user.

17. The method according to claim 1, for instant win competition entry by an entrant via a printed competition entry form that includes machine-readable coded data that can be sensed by the pen sensing device configured to generate interaction data based on the sensed coded data, the method comprising the steps, performed in a computer system, of:

receiving the interaction data representing interaction of the pen sensing device with the coded data, the competition entry being captured in the computer system by using the interaction data;

transmitting the competition entry to a competition administrator that is configured to determine whether the competition entry is an instant win entry.

18. The method according to claim 1, for providing anonymous electronic redemption of a coupon printed as part of a product label, the product label including machine-readable coded data, the method including the steps, performed in a computer system, of:

receiving interaction data representing interaction of the pen sensing device with the coded data, the coupon data of the coupon and a product identifier associated with the product label being electronically captured using the interaction data;

assigning a competition alias identifier (ID) to the coupon data; and transmitting the coupon data, the product identifier and the competition alias ID to a coupon administrator configured to redeem the coupon electronically.

19. The method according to claim 1, for providing anonymous and electronic redemption a plurality of coupons, wherein each the plurality of coupons is disposed on a product label and includes coded data that can be used to determine a unique product identifier of the product label with which it is associated, the method including the steps of:

using the pen sensing device, and for each of the plurality of coupons:

(a) generating interaction data by sensing at least some of the coded data of the coupon, the interaction data representing interaction of the pen sensing device with the coded data; and (b) forwarding the interaction data to a computer system, for electronic capture of the coupon offer and the product identifier associated with the product label in the computer system, for transmission of the coupon offer and the product identifier to a coupon administrator by the computer system; and receiving coupon redemption information from the coupon administrator after a predetermined combination of coupon offers relating to a plurality of the product identifiers and or coupon offers has been transmitted to the coupon administrator.

20. The method according to claim 1, for providing entry to a competition using a printed competition entry form including coded dada readable by the pen sensing device as the pen sensing device is used to interact with the entry form, the method including the steps, performed in a computer system, of:

receiving, from the pen sensing device interaction data representing interaction of the pen sensing device with the coded data, the competition entry being electronically captured in the computer system by using the interaction data, and pen sensing device identifier (ID) of the pen sensing device;

allocating a temporary registration to the pen sensing device ID or to a user of the pen sensing device, the registration including a return electronic address associated with the pen sensing device ID or the user;

transmitting the competition entry to a competition administrator; and verifying competition entry via the return electronic address.

21. The method according to claim 1, for validating entry to a competition via interaction of the pen sensing device with a printed competition entry form comprising coded data indicative of a unique product identifier, the method comprising the steps, performed in the computer system, of:

receiving, from the pen sensing device, the product identifier and interaction data representing interaction of the pen sensing device with the coded data, the interaction data including at least the unique product identifier, a competition entry being electronically captured in the computer system by using the interaction data; and transmitting the product identifier and the competition entry to a competition administrator for validation of the competition entry at the competition administrator by verification of the product identifier.

* * * * *